(12) United States Patent
Oh et al.

(10) Patent No.: US 7,300,831 B2
(45) Date of Patent: Nov. 27, 2007

(54) LIQUID CRYSTAL DISPLAY DEVICE HAVING DRIVING CIRCUIT AND METHOD OF FABRICATING THE SAME

(75) Inventors: Kum-Mi Oh, Gyeonggido (KR); Kwang-Sik Hwang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 457 days.

(21) Appl. No.: 11/099,519

(22) Filed: Apr. 6, 2005

(65) Prior Publication Data

US 2006/0008932 A1 Jan. 12, 2006

(30) Foreign Application Priority Data

Apr. 6, 2004 (KR) .......................... 2004-0023444

(51) Int. Cl.
*H01L 21/00* (2006.01)

(52) U.S. Cl. ................ 438/151; 438/149; 257/E21.419

(58) Field of Classification Search ................ 438/149, 438/151; 257/E21.411
See application file for complete search history.

(56) References Cited

U.S. PATENT DOCUMENTS

2001/0025959 A1* 10/2001 Yamazaki et al. ............ 257/72

FOREIGN PATENT DOCUMENTS

| JP | 10-223906 | 8/1998 |
| JP | 2001-264804 | 9/2001 |

* cited by examiner

*Primary Examiner*—Bradley K. Smith
(74) *Attorney, Agent, or Firm*—McKenna Long & Aldridge LLP

(57) ABSTRACT

A polycrystalline silicon thin film transistor of a bottom gate structure is used as a switching element and a mask having transmissive, half-transmissive and blocking areas is used so that an array substrate for a liquid crystal display device having a monolithic driving circuit can be fabricated through a six-mask process.

29 Claims, 39 Drawing Sheets

LIQUID CRYSTAL DISPLAY DEVICE HAVING DRIVING CIRCUIT AND METHOD OF FABRICATING THE SAME

This application claims the benefit of Korean Patent Application No. 2004-0023444, filed on Apr. 6, 2004, which is hereby incorporated by reference for all purposes as if set forth herein.

BACKGROUND OF THE INVENTION

1. Field of the Invention

The present invention relates to a display device and a method of fabricating a display device, and more particularly, to a liquid crystal display device having a driving circuit, and a method of fabricating the same.

2. Discussion of the Related Art

Flat panel display (FPD) devices having high portability and low power consumption have been the subject of recent research and development. Among various types of FPD devices, liquid crystal display (LCD) devices are commonly used as monitors for notebook and desktop computers because of their ability to display high-resolution images, wide ranges of different colors, and moving images.

In general, the LCD device includes a color filter substrate and an array substrate separated from each other by having a liquid crystal layer interposed therebetween, wherein the color filter substrate and the array substrate include a common electrode and a pixel electrode, respectively. When a voltage is supplied to the common electrode and the pixel electrode, an electric field is generated that changes the orientation of liquid crystal molecules of the liquid crystal layer due to optical anisotropy within the liquid crystal layer. Consequently, light transmittance characteristics of the liquid crystal layer are modulated and images are displayed by the LCD device.

Active matrix type display devices are commonly used because of their superiority in displaying moving images. Active matrix-type display devices include pixel regions disposed in a matrix form where a thin film transistor (TFT) is formed in the pixel region as a switching element. While forming the TFT, hydrogenated amorphous silicon (a-Si:H) is selected to be deposited over a large area of substrate. Hydrogenated amorphous silicon yields higher productivity while easily fabricated on the large area of the substrate. In addition, the hydrogenated amorphous silicon (a-Si:H) is deposited at a relatively low temperature, a glass substrate of low cost can be used. Accordingly, the hydrogenated amorphous silicon is used mainly in the TFT, which is referred to as an amorphous silicon thin film transistor (a-Si TFT).

However, because the hydrogenated amorphous silicon has a disordered atomic arrangement, weak silicon-silicon (Si—Si) bonds and dangling bonds exist in the hydrogenated amorphous silicon. These types of bonds become metastable when light or an electric field is applied to the hydrogenated amorphous silicon. As a result, this metastability makes the TFT unstable. Electrical characteristics of the hydrogenated amorphous silicon are especially degraded due to light irradiation. Furthermore, a TFT using the hydrogenated amorphous silicon is difficult to be implemented in a driving circuit due to degraded electric characteristics such as a relatively low field effect mobility and a poor reliability.

To solve these problems, a polycrystalline silicon thin film transistor (p-Si TFT) is suggested. Due to a higher field effect mobility of a p-Si TFT compared to an a-Si TFT, fabrication of a driving circuit and a switching element can be achieved simultaneously. Accordingly, the production cost is reduced and a driving circuit is simply fabricated on a substrate where a switching element is formed.

FIG. 1 is a schematic view showing a liquid crystal display device according to the related art where a switching element and a driving circuit are formed on a single substrate. In FIG. 1, a driving area 5 and a display area 3 are defined on a single substrate 1. The display area 3 is disposed at a central portion of the substrate 1, while the driving area 5 is disposed at left and top portions of the display area 3. The driving area 5 includes a gate driving circuit 5a and a data driving circuit 5b. The display area 3 includes a plurality of gate lines 7 connected to the gate driving circuit 5a and a plurality of data lines 9 connected to the data driving circuit 5b. The gate line 7 and the data line 9 intersect each other to define a pixel region "P." A pixel electrode 10 is formed in the pixel region "P." A thin film transistor (TFT) "T" formed as a switching element is connected to the pixel electrode 10. The gate driving circuit 5a supplies a scan signal to the TFT "T" through the gate line 7 and the data driving circuit 5b supplies a data signal to the pixel electrode 10 through the data line 9.

The gate driving circuit 5a and the data driving circuit 5b are connected to an input terminal 12 to receive external signals. Accordingly, the gate driving circuit 5a and the data driving circuit 5b process the externals signals from the input terminal 12 to generate the scan signal and the data signal. To generate the scan signal and the data signal, the gate driving circuit 5a and the data driving circuit 5b include a plurality of TFTs forming complementary metal-oxide-semiconductor (CMOS) logic. For example, an inverter including negative(n)-type and positive(p)-type TFTs may be formed in the gate driving circuit 5a and the data driving circuit 5b.

FIGS. 2A to 2F are schematic cross-sectional views showing a process of fabricating a thin film transistor in a display area of a liquid crystal display device according to the related art. FIGS. 3A to 3F are schematic cross-sectional views showing a process of fabricating n-type and a p-type thin film transistors in a driving area of a liquid crystal display device according to the related art.

In FIGS. 2A and 3A, a buffer layer 25 is formed on a substrate 20 and an amorphous silicon layer is formed on the buffer layer 25. The amorphous silicon layer is crystallized to a polycrystalline silicon layer by a laser annealing method. The amorphous silicon layer may be dehydrogenated before crystallizing to a polycrystalline silicon layer. The polycrystalline silicon layer is patterned through a first mask process to form a first semiconductor layer 30 in a pixel TFT portion "I," a second semiconductor layers 35 in an n-type driving TFT portion "II" and a third semiconductor layer 40 in a p-type driving TFT portion "III."

In FIGS. 2B and 3B, a gate insulating layer 45 of silicon oxide ($SiO_2$) is formed on the semiconductor layers 30, 35 and 40. After depositing a metallic material on the gate insulating layer 45, first, second and third gate electrodes 50, 55 and 60 are formed on the gate insulating layer 45 through a second mask process. Then, the semiconductor layers 30, 35 and 40 are doped with low concentration n-type (n−) impurities using the gate electrodes 50, 55 and 60 as doping masks. Accordingly, a portion of the first semiconductor layer 30 directly underneath the first gate electrode 50 is not doped with n− impurities, while the other portion of the first semiconductor layer 30 is doped with n− impurities. Similarly, the second and third semiconductor layers 35 and 40 are partially doped with n− impurities. As a result, the semiconductor layers 30, 35 and 40 are divided into undoped regions 30a, 35a and 40a and n– doped regions 30b, 35b and 40b. The undoped regions 30a, 35a and 40a are used as an active region of a TFT.

In FIGS. 2C and 3C, first, second and third n+ photoresist (PR) patterns 61, 62 and 63 are formed through a third mask process. The first and second n+ PR patterns 61 and 62 cover the first and second gate electrodes 50 and 55, respectively. In addition, the first n+ PR pattern 61 covers a predetermined portion of the first semiconductor layer 30 adjacent to the first gate electrode 50 and the second n+ PR pattern 62 covers a predetermined portion of the second semiconductor layer 35 adjacent to the second gate electrode 55. The third n+ PR pattern 63 completely covers the third semiconductor layer 40 including the third gate electrode 60. Next, the first, second and third semiconductor layers 30, 35 and 40 are doped with high concentration n-type impurities (n+) using the first, second and third n+ PR patterns 61, 62 and 63 as doping masks. Accordingly, the predetermined portions of the first and second semiconductor layers 30 and 35 are not doped with n+ impurities, while the exposed portions of the first and second semiconductor layers 30 and 35 are doped with n+ impurities. In addition, the third semiconductor layer 40 is not doped with n+ impurities. As a result, the exposed portions of the first and second semiconductor layers 30 and 35 become n+ doped regions 30c and 35c, which are used as an ohmic contact regions of n-type, and the predetermined portions of the first and second semiconductor layers 30 and 35 that remain n– doped regions 30b and 35b are used as a lightly doped drain (LDD) region. Therefore, the active regions 30a and 35a, the LDD regions 30b and 35b, and the n-type ohmic contact regions 30c and 35c are defined by doping with n– impurities and n+ impurities. After doping with n+ impurities, the first, second and third n+ PR patterns 61, 62 and 63 are removed.

In FIGS. 2D and 3D, the first and second p+ PR patterns 65 and 66 are formed through a fourth mask process. The first and second p+ PR patterns 65 and 66 completely cover the first and second semiconductor layers 30 and 35, respectively. The third semiconductor layer 40 is exposed, because no p+ PR pattern is provided in the portion "III." Next, the semiconductor layers 30, 35 and 40 are doped with high concentration p-type (p+) impurities using the first and second p+ PR patterns 65 and 66 and the third gate electrode 60 as doping masks. Accordingly, the first and second semiconductor layers 30 and 35 are not doped with p+ impurities. In addition, a portion of the third semiconductor layer 40 directly underneath the third gate electrode 60 is not doped with p+ impurities, while the other portion of the third semiconductor layer 40 is doped with p+ impurities. Because the p+ impurities have a concentration higher than the n– impurities in the exposed portion of third semiconductor layer 40, the p-type impurities compensate the n-type impurities. Accordingly, the exposed portion of the third semiconductor layer 40 becomes p+ doped region 40b which is used as an ohmic contact region of p-type. Therefore, the active regions 40a and the p-type ohmic contact region 40b are defined by doping with p+ impurities. After doping with p+ impurities, the first and second p+ PR patterns 65 and 66 are removed.

In FIGS. 2E and 3E, an interlayer insulating layer 70 of an inorganic insulating material such as silicon nitride ($SiN_x$) and silicon oxide ($SiO_2$) is formed on the gate electrodes 50, 55 and 60 through a fifth mask process. The interlayer insulating layer 70 has semiconductor contact holes 73a, 73b, 75a, 75b, 77a and 77b defined through the gate insulating layer 45 to expose the ohmic contact regions 30c, 35c and 40c. First source and drain electrodes 80a and 80b, second source and drain electrodes 83a and 83b, and third source and drain electrodes 87a and 87b are formed on the interlayer insulating layer 70 through a sixth mask process. The source and drain electrodes 80a, 80b, 83a, 83b, 87a and 87b have a double layer structure formed of molybdenum (Mo) and aluminum-neodymium (AlNd), and are connected to the ohmic contact regions 30c, 35c and 40c within the semiconductor contact holes 73a, 73b, 75a, 75b, 77a and 77b.

In FIGS. 2F and 3F, a passivation layer 90 of silicon nitride ($SiN_x$) is formed on the source and drain electrodes 80a, 80b, 83a, 83b, 87a and 87b through a seventh mask process. The passivation layer 90 may be hydrogenated and has a drain contact hole 95 exposing the first drain electrode 80b. Next, a pixel electrode 97 of indium-tin-oxide (ITO) is formed on the passivation layer 90 through an eighth mask process. The pixel electrode 97 is connected to the first drain electrode 80b within the drain contact hole 95.

As mentioned above, the array substrate for an LCD device according to the related art is fabricated through an eight-mask process. Because the related art mask process includes steps of coating PR, exposing PR, and developing PR, increase in production cost and fabrication time as well as a reduced production yield results from an increased number of masks. In addition, reliability of a thin film transistor is reduced accordingly.

SUMMARY OF THE INVENTION

Accordingly, the present invention is directed to a liquid crystal display device and a method of fabricating the same that substantially obviates one or more of the problems due to limitations and disadvantages of the related art.

An object of the present invention is to provide a liquid crystal display device using a thin film transistor of a bottom gate structure and a method of fabricating the same through a reduced number of mask processes.

Another object of the present invention is to provide an array substrate for a liquid crystal display device and a method of fabricating the same where production yield is improved and fabrication cost is reduced based on a five-mask process.

Another object of the present invention is to provide a thin film transistor for a liquid crystal display device and a method of fabricating the same where source and drain electrodes are formed after forming a passivation layer on a semiconductor layer of polycrystalline silicon to protect a channel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating an array substrate structure for a liquid crystal display device includes: sequentially forming a transparent conductive material layer and a metallic material layer on a substrate defining a display area and a non-display area, the display area having a pixel TFT portion and a pixel electrode area, and the non-display area having an n-type driving TFT portion and a p-type driving TFT portion; forming a first gate electrode in the p-type driving TFT portion, a second gate electrode in the n-type driving TFT portion, a third gate electrode in the pixel TFT portion, a gate line in the display area, a pixel electrode in the pixel electrode area, and a first capacitor electrode connected to the pixel electrode through a first mask process; sequentially forming a gate insulating layer and a silicon layer on the first gate electrode, the second gate electrode, the third gate electrode, the gate line, the pixel electrode and the first capacitor electrode; doping the silicon layer in the p-type driving TFT portion with high concentration p-type impurities (p+) through a second mask process to define a first active region and a first ohmic contact region; doping the silicon layer in the pixel TFT portion and the n-type driving TFT portion with high concentration n-type impurities (n+) and low concentration n-type impurities (n−) through a third mask process to define second and third active regions, second and third ohmic contact regions, first and second lightly doped drain (LDD) regions and a storage capacitor area; forming a first semiconductor layer in the p-type driving TFT portion, a second semiconductor layer in the n-type driving TFT portion, a third semiconductor layer in the pixel TFT portion, and a second capacitor electrode in the storage capacitor area through a fourth mask process; forming a passivation pattern on the first, second and third semiconductor layers through a fifth mask process, wherein the passivation pattern covers the first, second and third active regions, and wherein the first, second and third ohmic contact regions are exposed through the passivation pattern; and forming first source and drain electrodes, second source and drain electrodes, third source and drain electrodes and a data line through a sixth mask process, the first source and drain electrodes contacting the first ohmic contact region, the second source and drain electrodes contacting the second ohmic contact region, the third source and drain electrodes contacting the third ohmic contact region, and the data line connected to the third source electrode.

In another aspect, A method of fabricating an array substrate structure for a liquid crystal display device includes: sequentially disposing a transparent conductive material layer and a metallic material layer on a substrate defining a display area and a non-display area, the display area having a pixel TFT portion and a pixel electrode area, and the non-display area having a driving TFT portion; forming a first gate electrode in the pixel TFT portion and a second gate electrode in the driving TFT portion, a gate line in the display area, a pixel electrode in the pixel electrode area through a first mask process, wherein a first capacitor electrode is connected to the pixel electrode; sequentially disposing a gate insulating layer and a silicon layer on the first, second gate electrodes, the gate line, the pixel electrode, and the first capacitor electrode; doping the silicon layer with impurities through a second mask process to define a first active region, a first ohmic contact region, and storage capacitor area in the pixel TFT portion, and a second active region and a second ohmic contact region in the driving TFT portion; forming a first semiconductor layer in the pixel TFT portion, a second semiconductor layer in the driving TFT portion, and a second capacitor electrode in the storage capacitor area through a third mask process; forming a passivation pattern on the first and second silicon layer through a fourth mask process, wherein the passivation pattern covers the first and second active regions, and wherein the first and second ohmic contact regions are exposed through the passivation pattern; forming first source and drain electrodes, second source and drain electrodes, and a data line through a fifth mask process, the first source and drain electrodes contacting the first ohmic contact region, the second source and drain electrodes contacting the second ohmic contact region, and the data line connected to the first source electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
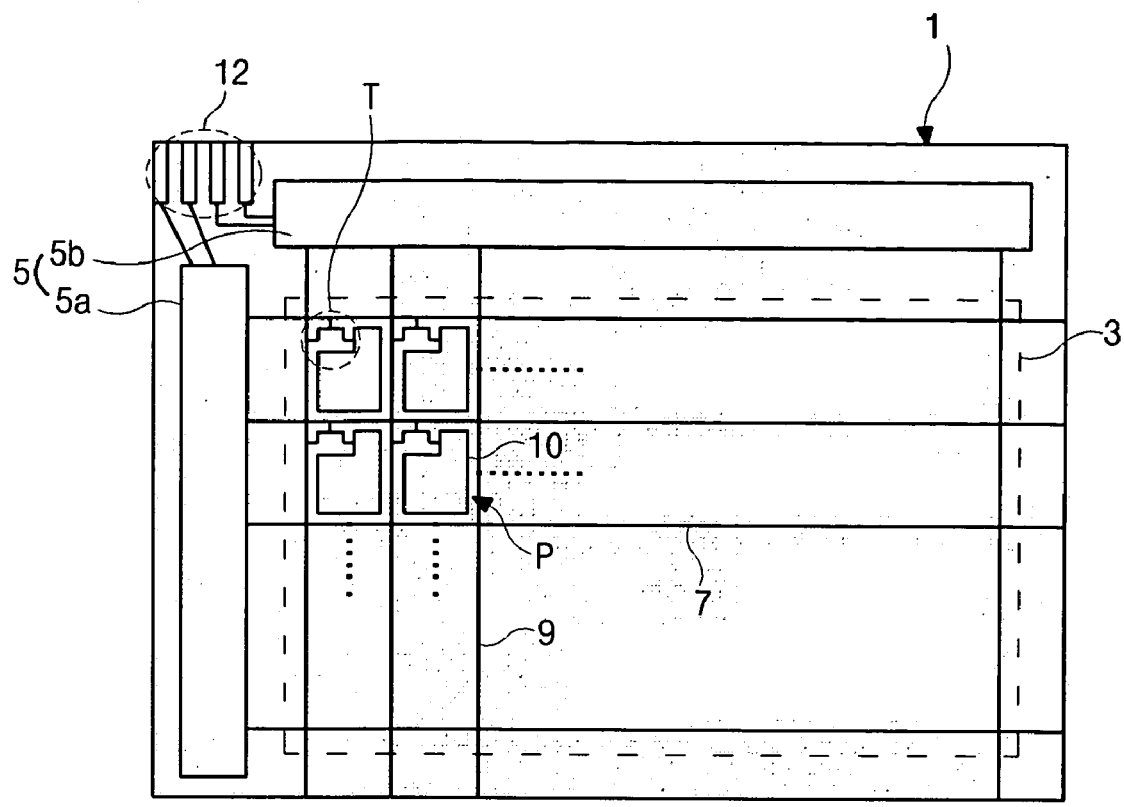
FIG. 1 is a schematic view illustrating a liquid crystal display device according to the related art where a switching element and a driving circuit are formed on a single substrate.
Figure 2A:
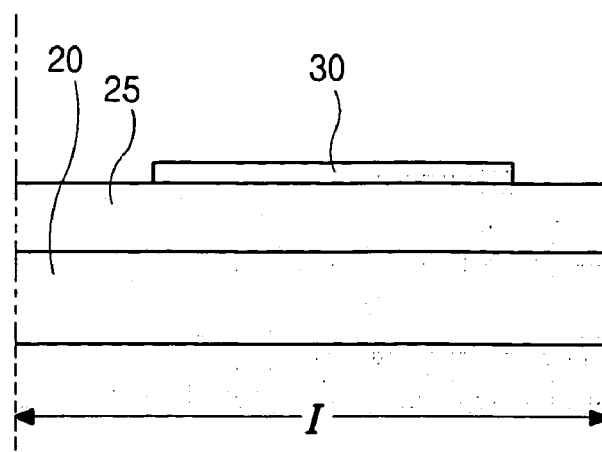
FIGS. 2A to 2F are schematic cross-sectional views illustrating a process of fabricating a thin film transistor in a display area of a liquid crystal display device according to the related art.
Figure 2B:
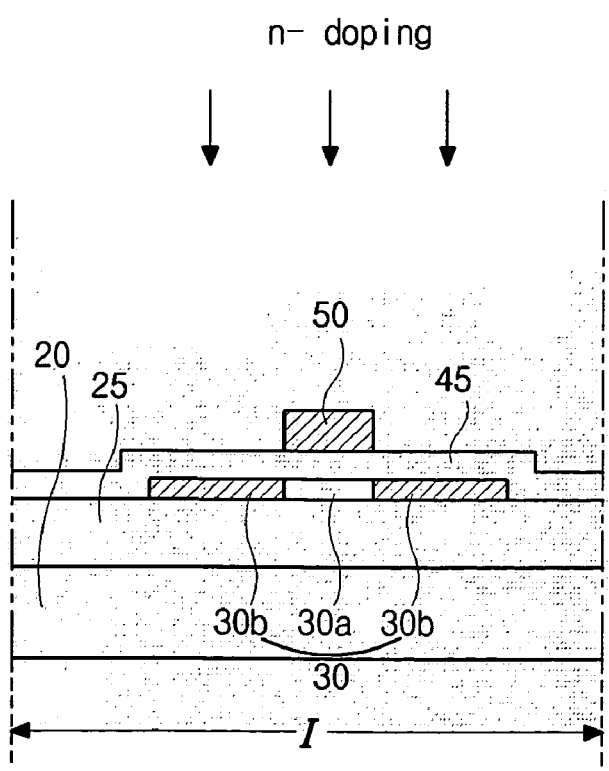
Figure 2C:
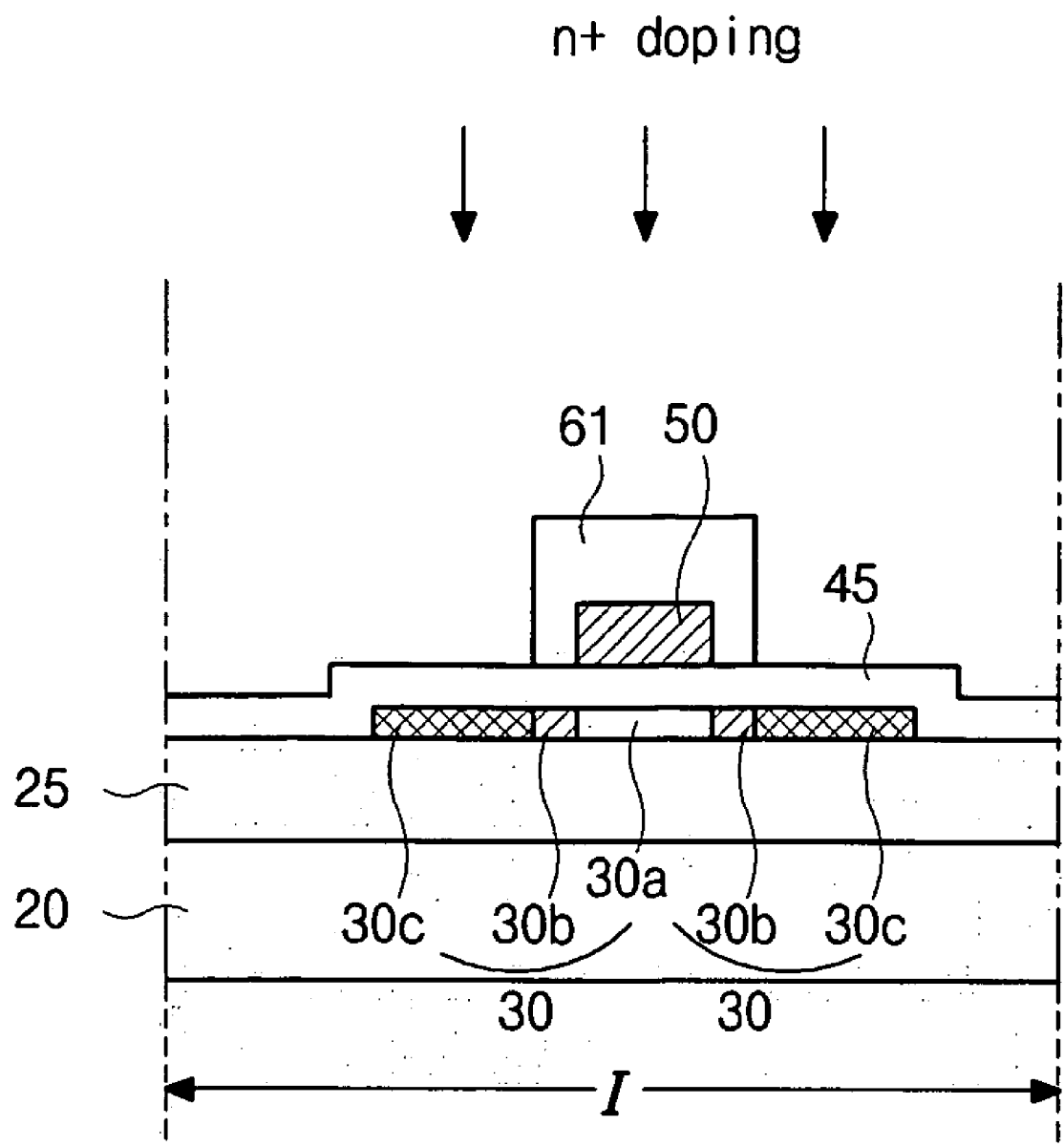
Figure 2D:
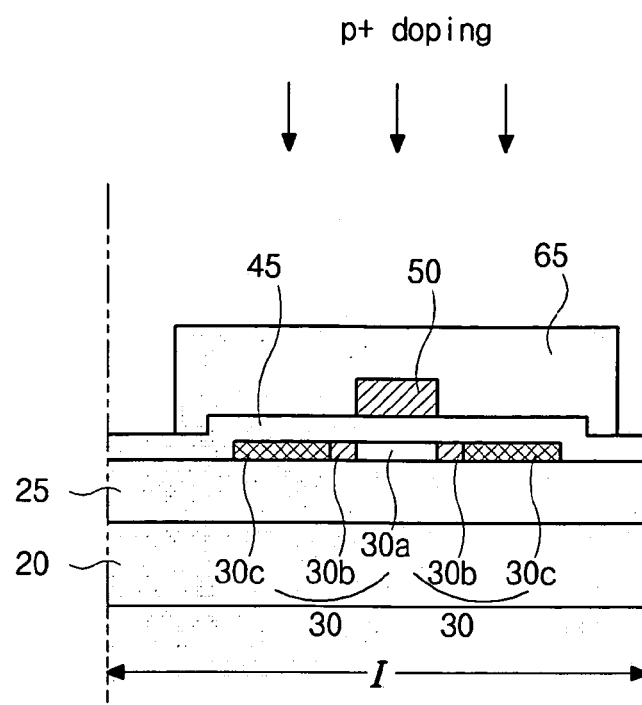
Figure 2E:
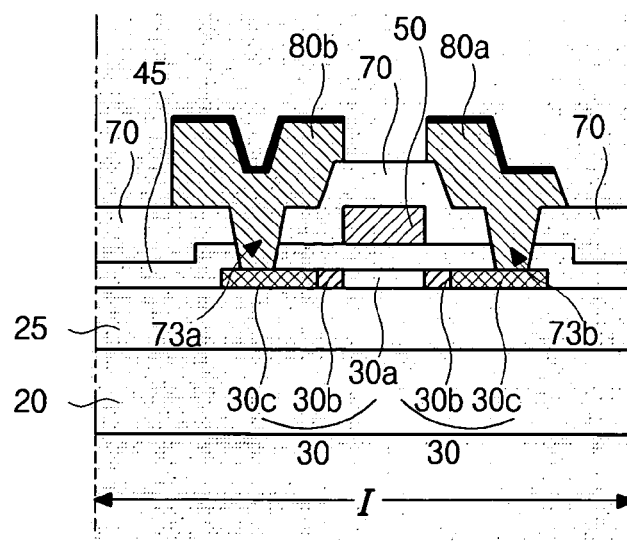
Figure 2F:
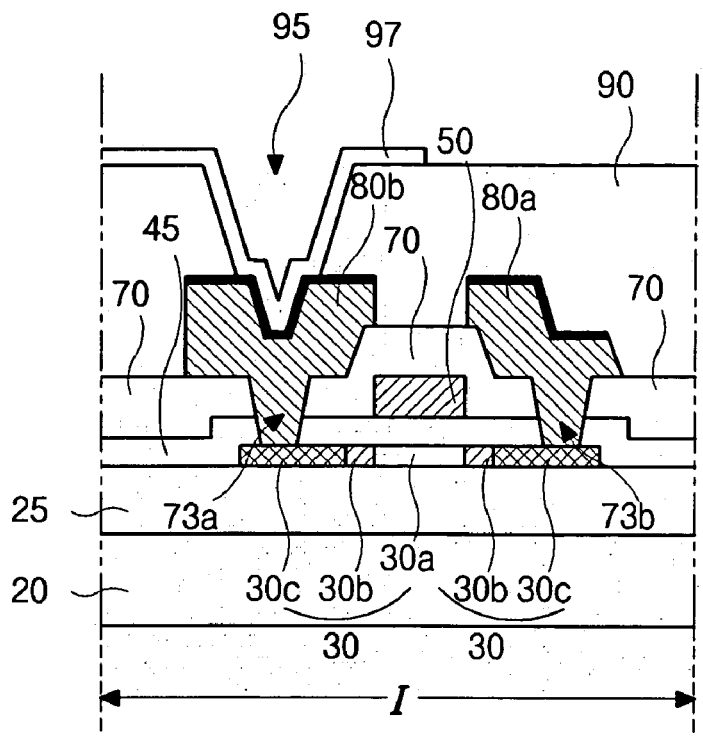
Figure 3A:
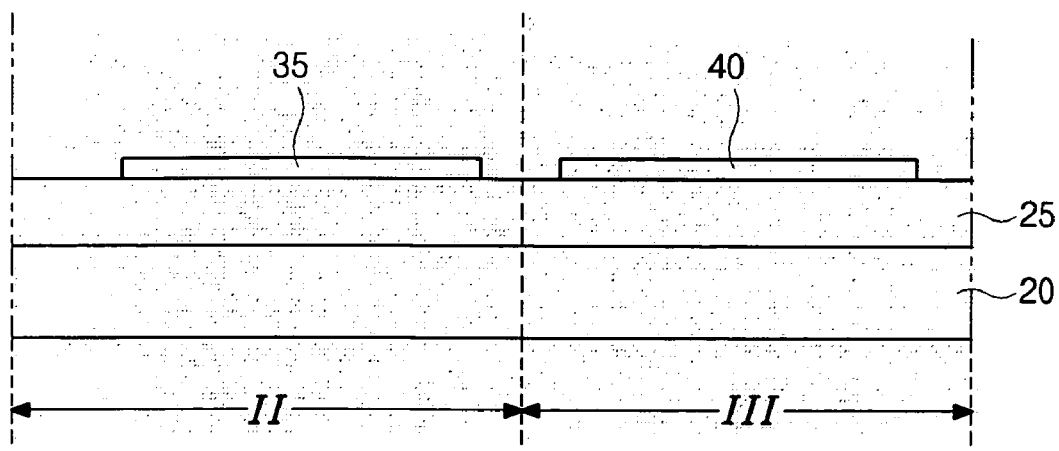
FIGS. 3A to 3F are schematic cross-sectional views illustrating a process of fabricating n-type and a p-type thin film transistors in a driving area of a liquid crystal display device according to the related art.
Figure 3B:
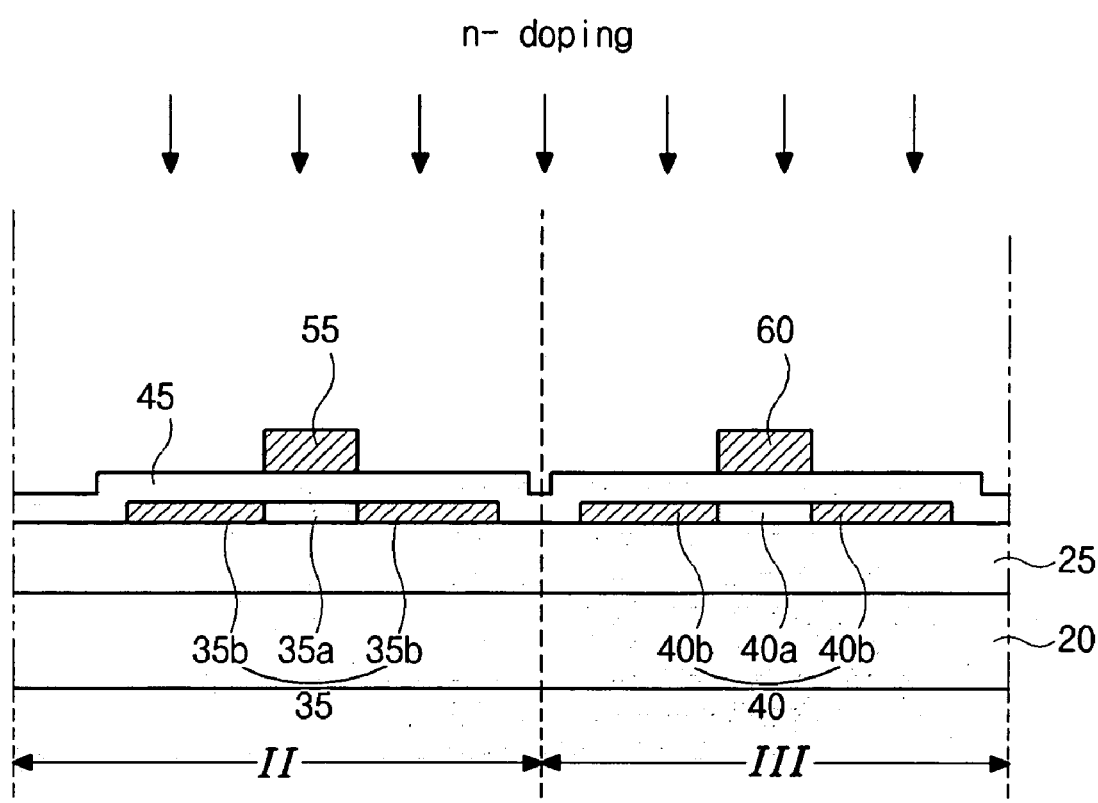
Figure 3C:
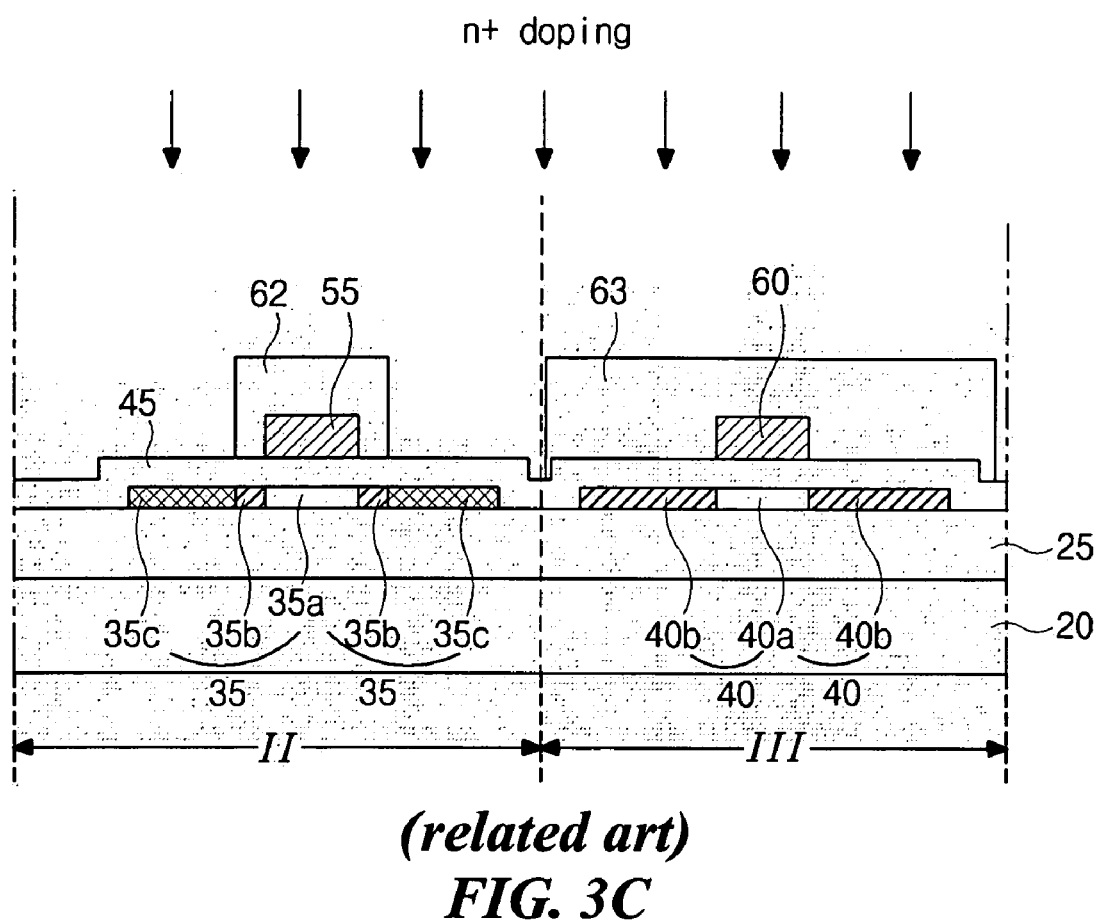
Figure 3D:
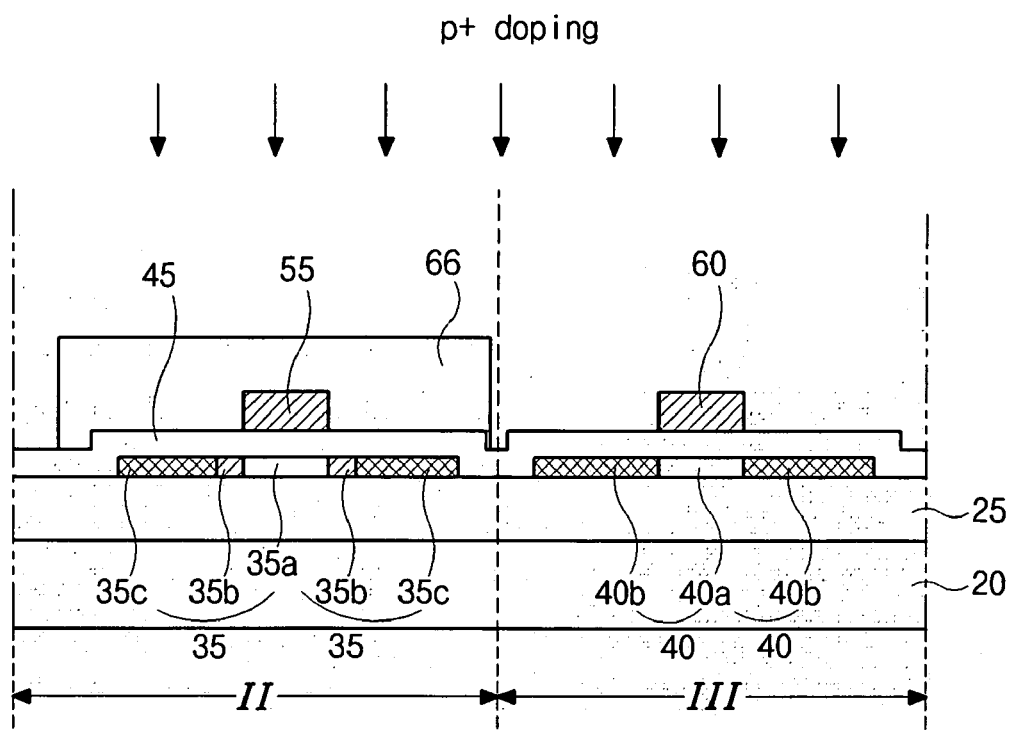
Figure 3E:
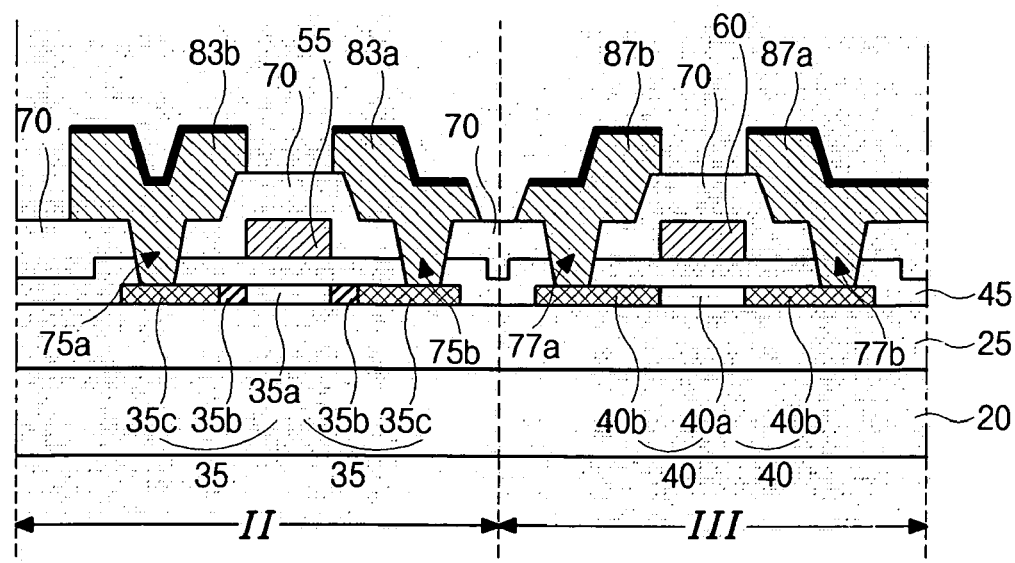
Figure 3F:
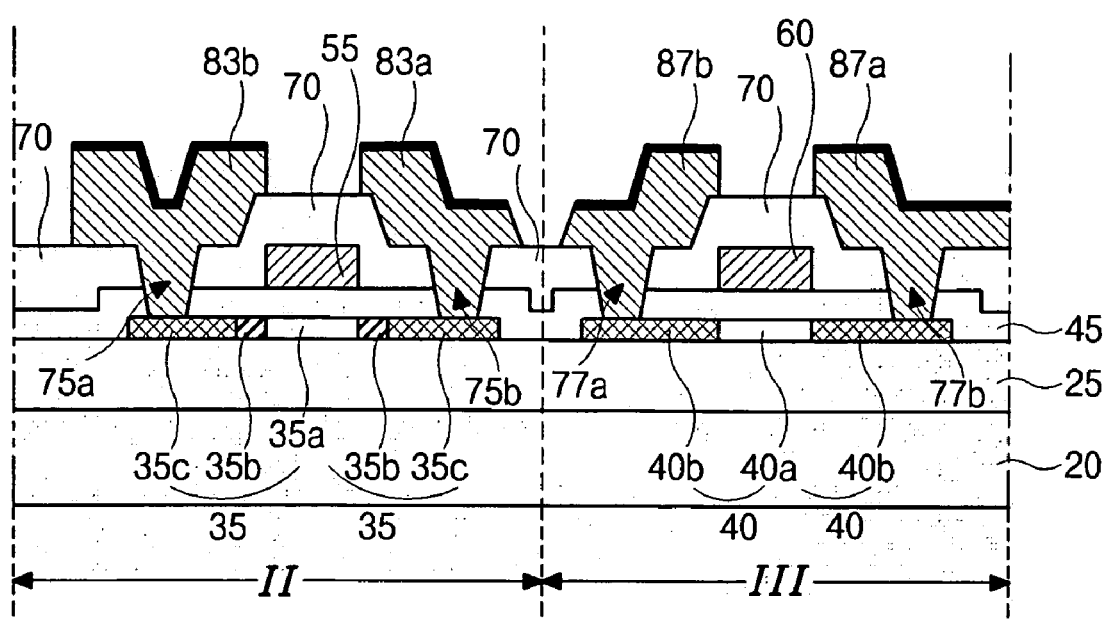
Figure 4:
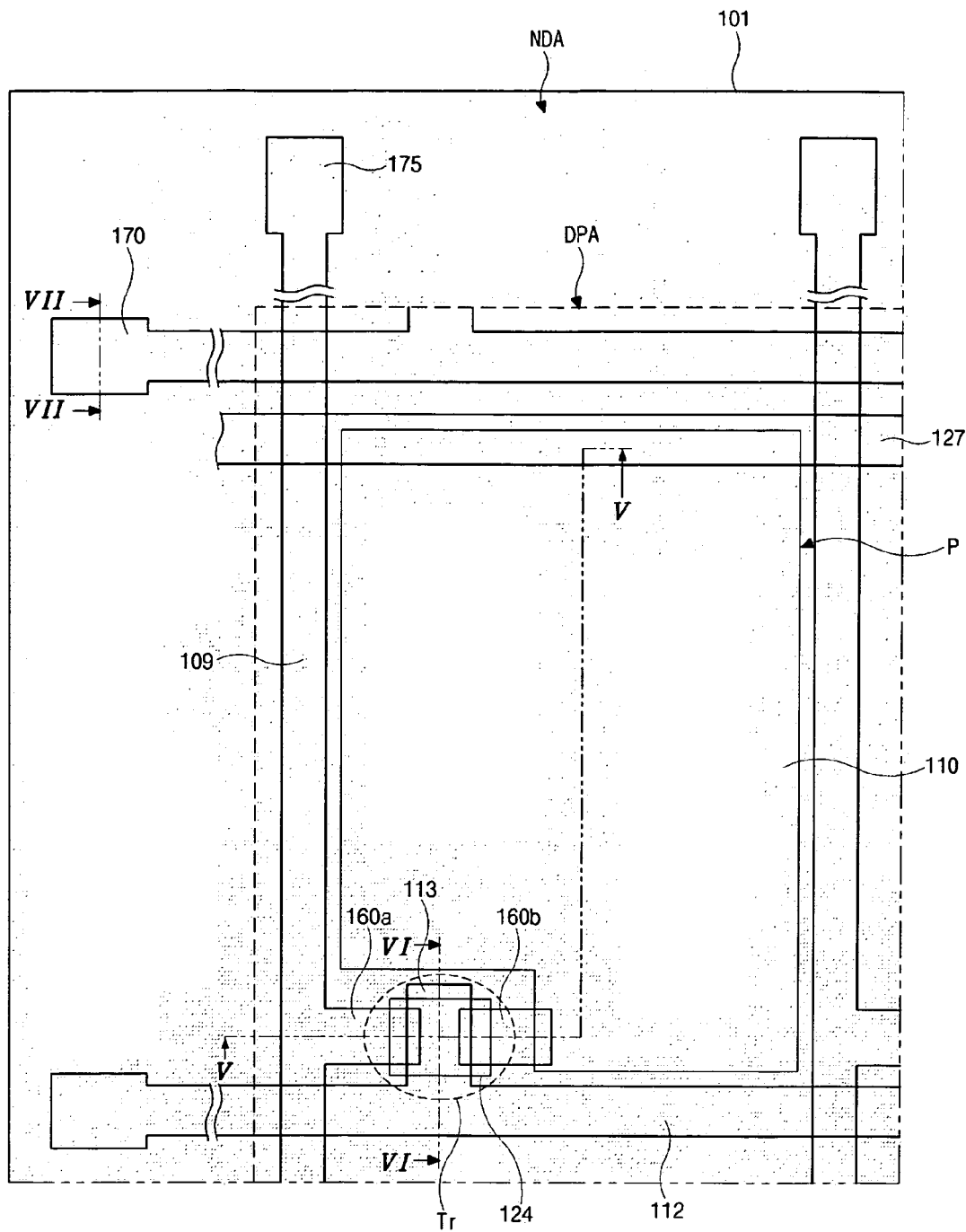
FIG. 4 is a schematic plane view illustrating an array substrate for a liquid crystal display device according to an exemplary embodiment of the present invention.

FIG. 4 is a schematic plane view showing an array substrate for a liquid crystal display device according to an exemplary embodiment of the present invention. FIG. 4 shows a display area and a pad area of the array substrate, and it does not show a driving area of the array substrate for simplicity.

In FIG. 4, a gate line 112 and a data line 109 are formed on a substrate 101 in a display area "DPA." A gate pad 170 is formed at one end of the gate line 112 and a data pad 175 is formed at one end of the data line 109. The gate line 112 crosses the data line 109 to define a pixel region "P." A thin film transistor (TFT) "Tr" formed as a switching element is connected to the gate line 112 and the data line 109. The gate pad 170 and the data pad 175 are disposed in a non-display area "NDA" at a periphery of the display area "DPA." In addition, a common line 127 is disposed parallel to and spaced apart from the gate line 112. A pixel electrode 110 connected to the TFT "Tr" is disposed in the pixel region "P" and overlaps the common line 127 to form a storage capacitor. The pixel electrode 110 directly contacts the TFT "Tr" without a contact hole.

FIGS. 5A to 5L are schematic cross-sectional views taken along line "V-V" of FIG. 4. FIGS. 6A to 6L are schematic cross-sectional views taken along line "VI-VI" of FIG. 4. FIGS. 7A to 7L are schematic cross-sectional views taken along line "VII-VII" of FIG. 4. FIGS. 5A to 5L, FIGS. 6A to 6L, and FIGS. 7A to 7L show a fabricating process of a pixel thin film transistor, a storage capacitor in a display area, and a gate pad disposed in a non-display area of an array substrate according to an exemplary embodiment of the present invention. In addition, FIGS. 8A to 8L are schematic cross-sectional views showing a fabricating process of n-type and p-type driving thin film transistors in a driving area of an array substrate according to an exemplary embodiment of the present invention.

According to the FIGS. 5A, 6A, 7A and 8A, a buffer layer 103 of an inorganic insulating material such as silicon nitride ($SiN_x$) and silicon oxide ($SiO_2$) is formed on a substrate 101 having a driving area and a display area. When amorphous silicon is crystallized to a polycrystalline silicon by a laser annealing method, alkali ions such as potassium ions ($K^+$) and sodium ions ($Na^+$) may erupt from a substrate due to a heat produced by a laser beam. The buffer layer 103 prevents deterioration of polycrystalline silicon due to the alkali ions. Next, a transparent conductive material layer 106 and a metallic material layer 107 are sequentially formed on the buffer layer 103. For example, the transparent conductive material layer 106 may include one of indium-tin-oxide (ITO) and indium-zinc-oxide (IZO) whose thickness fits within a range of about 500 Å to about 1000 Å. The metallic material layer 107 may include molybdenum (Mo) to have a thickness equal to or less than about 3000 Å.

After a first photoresist (PR) layer 108 is formed on the metallic material layer 107, a gate-pixel mask 170 having a transmissive area "TA," a blocking area "BA" and a half-transmissive area "HTA" is disposed over the first PR layer 108. The half-transmissive area "HTA" has a light transmittance lower than the transmissive area "TA" but higher than the blocking area "BA." The half-transmissive area "HTA" corresponds to gate electrode areas "GA" of a pixel thin film transistor (TFT) portion "A," an n-type driving TFT portion "B" and a p-type driving TFT portion "C." Furthermore, the half-transmissive area "HTA" corresponds to a pixel electrode area "PA" and a storage capacitor area "StgA" of the pixel TFT portion "A" and a gate pad area "GPA" of the non-display area. The blocking area "BA" corresponds to a gate line area "GLA." A positive type PR without exposed portion is used in this embodiment, however, a negative type PR may be used in another embodiment by changing the areas of the gate-pixel mask 170. Then, the first PR layer 108 is exposed through the gate-pixel mask 170. For example, when the half-transmissive area "HTA" includes a slit, light may be irradiated through the slit by diffraction.

Figure 6A:
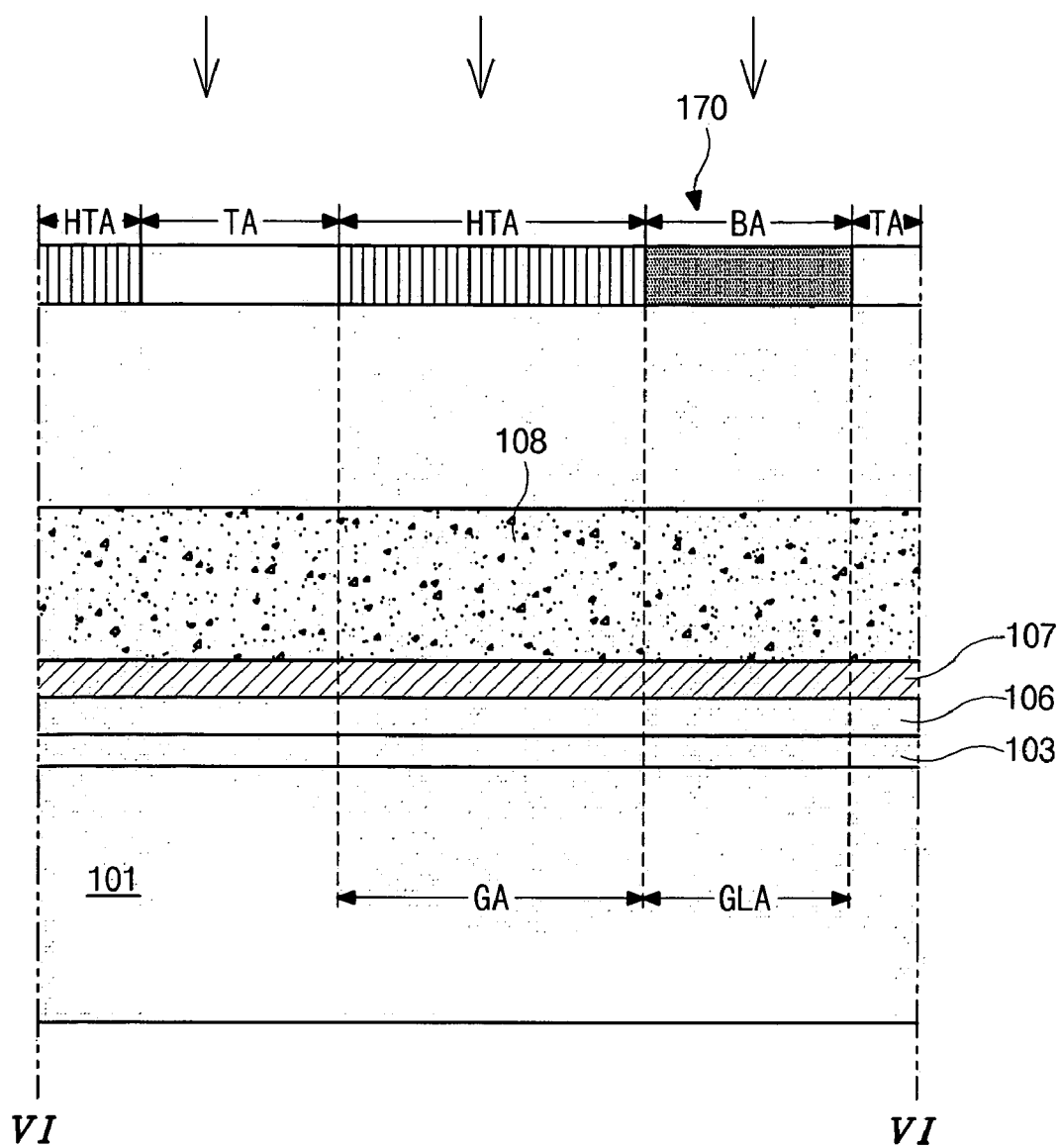
FIGS. 6A to 6L are schematic cross-sectional views taken along line "VI-VI" of FIG. 4 illustrating a fabricating process of a pixel thin film transistor in a display area of an array substrate for a liquid crystal display device according to an exemplary embodiment of the present invention.
Figure 6B:
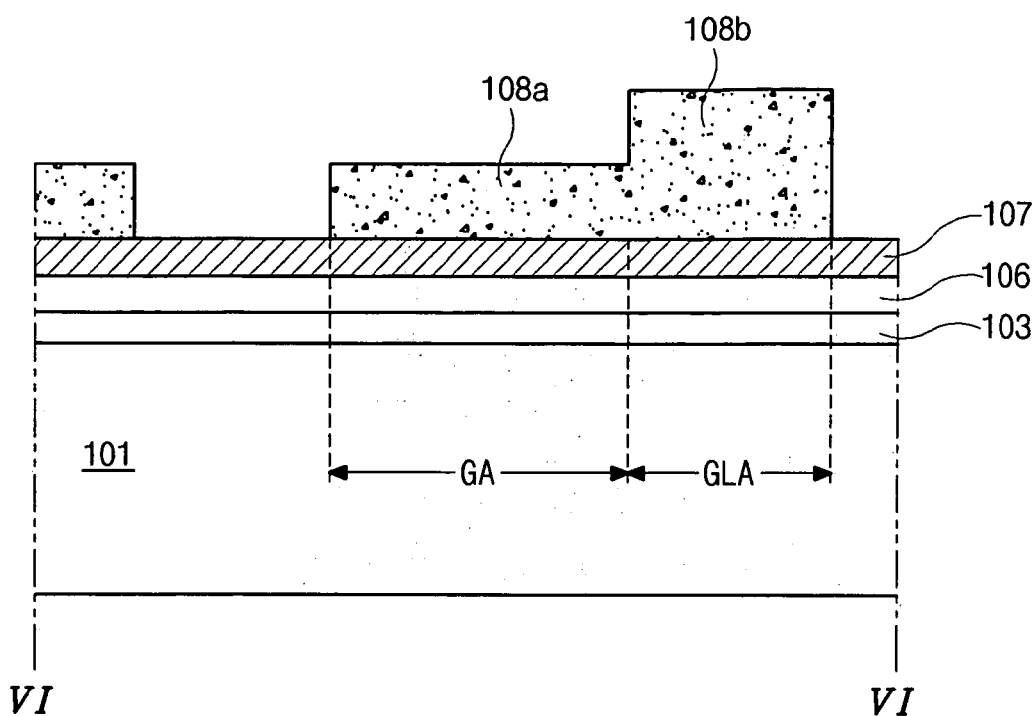
Figure 6C:
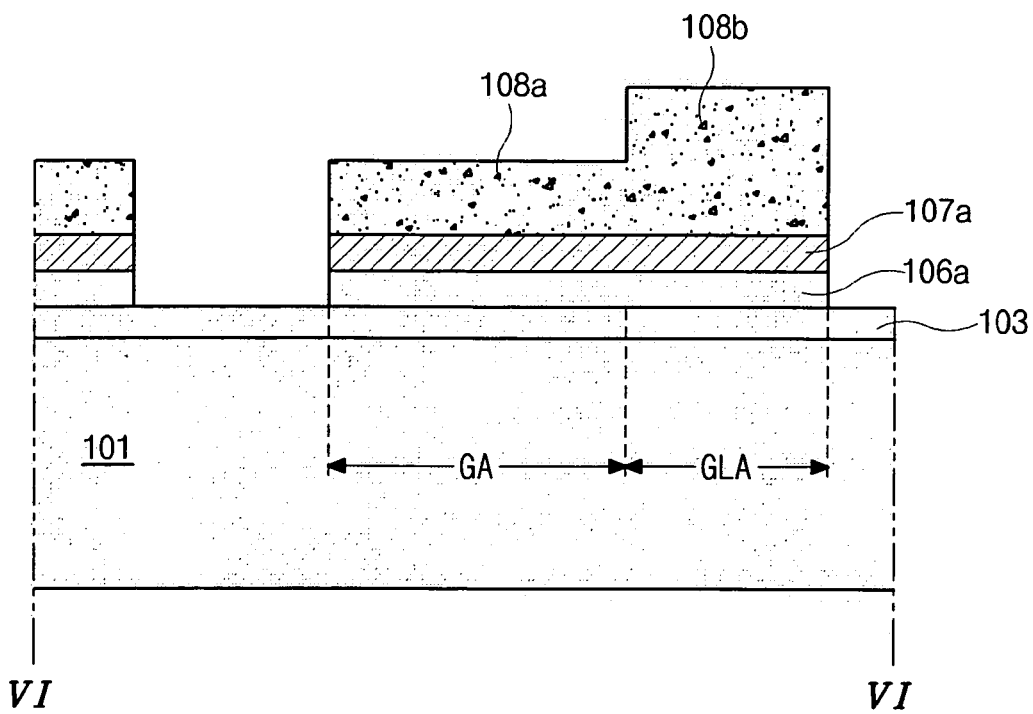

In FIGS. 5B, 6B, 7B and 8B, the first PR layer 108 (of FIG. 5A) is developed to form a first gate-pixel PR pattern 108a and a second gate-pixel PR pattern 108b. The first and second gate-pixel PR patterns 108a and 108b correspond to the half-transmissive area "HTA" and the blocking area "BA" of the gate-pixel mask 170, respectively. As illustrated in FIG. 6B, the first gate-pixel PR pattern 108a has a reduced thickness as compared to the second gate-pixel PR pattern 108b, and the first and second gate-pixel PR patterns 108a and 108b are formed through a first mask process.

In FIGS. 5C, 6C, 7C and 8C, the metallic material layer 107 and the transparent conductive material layer 106 are sequentially etched using the first and second gate-pixel PR patterns 108a and 108b as an etching mask to form a transparent conductive material pattern 106a and a metallic material pattern 107a.

Figure 5A:
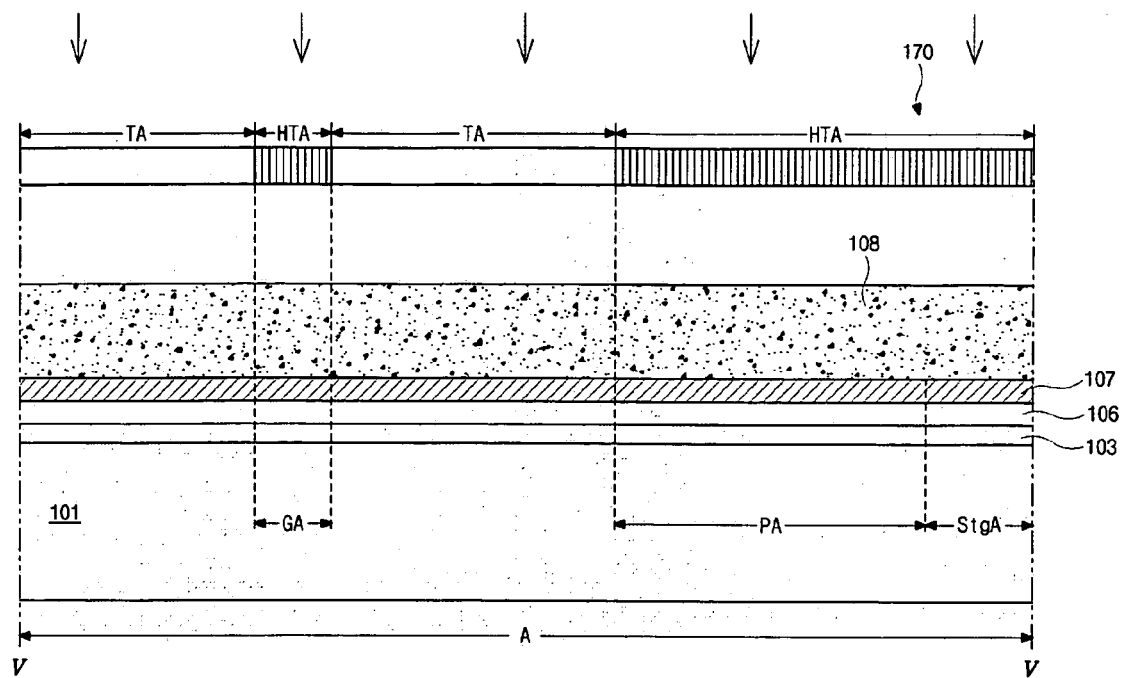
FIGS. 5A to 5L are schematic cross-sectional views taken along line "V-V" of FIG. 4 illustrating a fabricating process of a pixel thin film transistor and a storage capacitor in a display area of an array substrate according to an exemplary embodiment of the present invention.
Figure 5B:
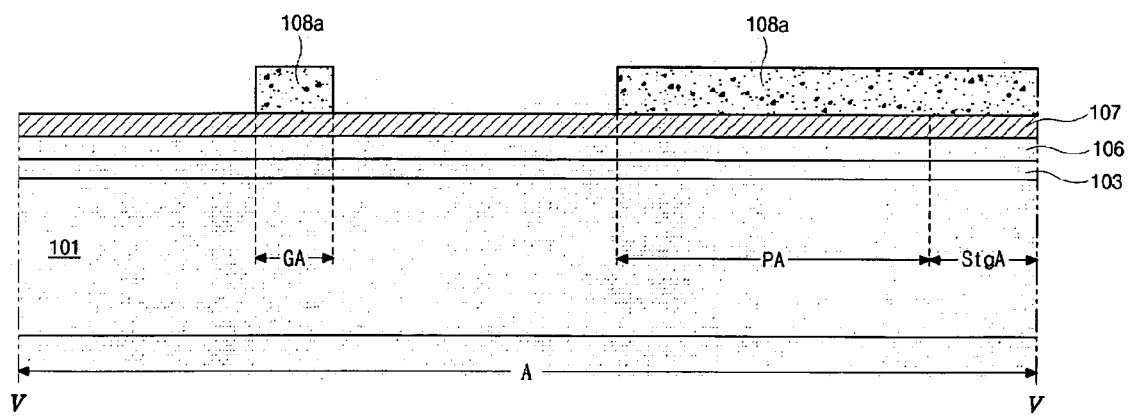
Figure 5C:
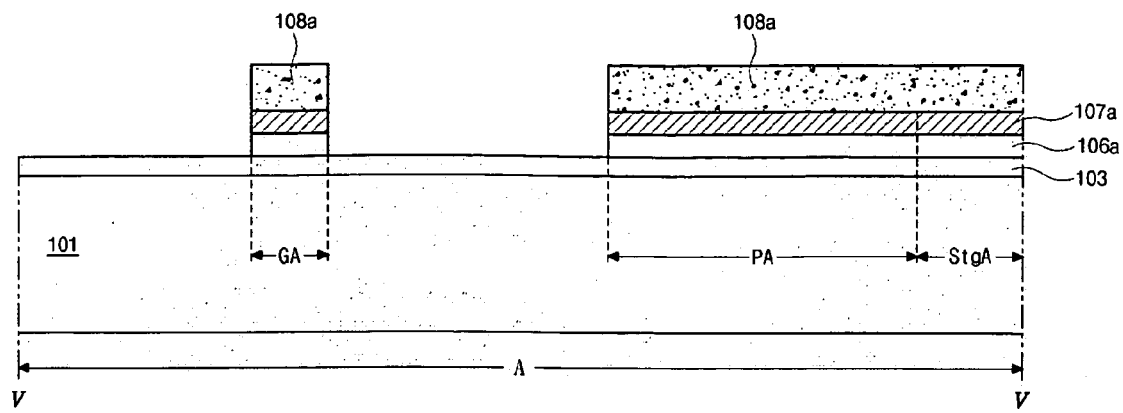
Figure 5D:
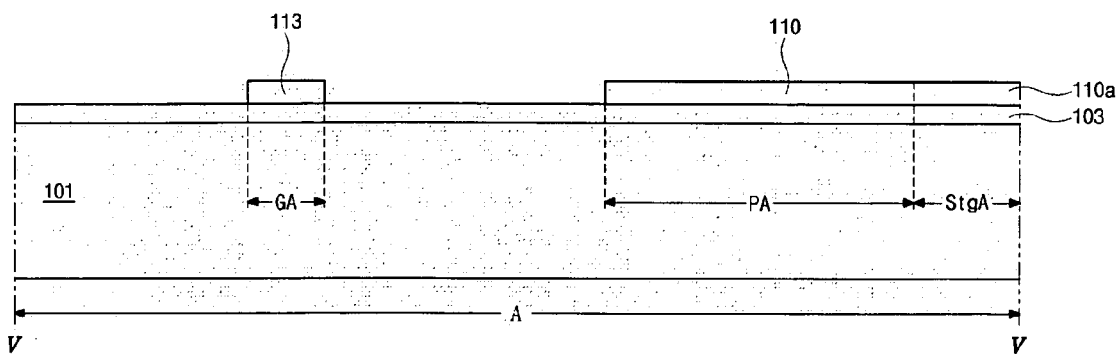
Figure 5E:
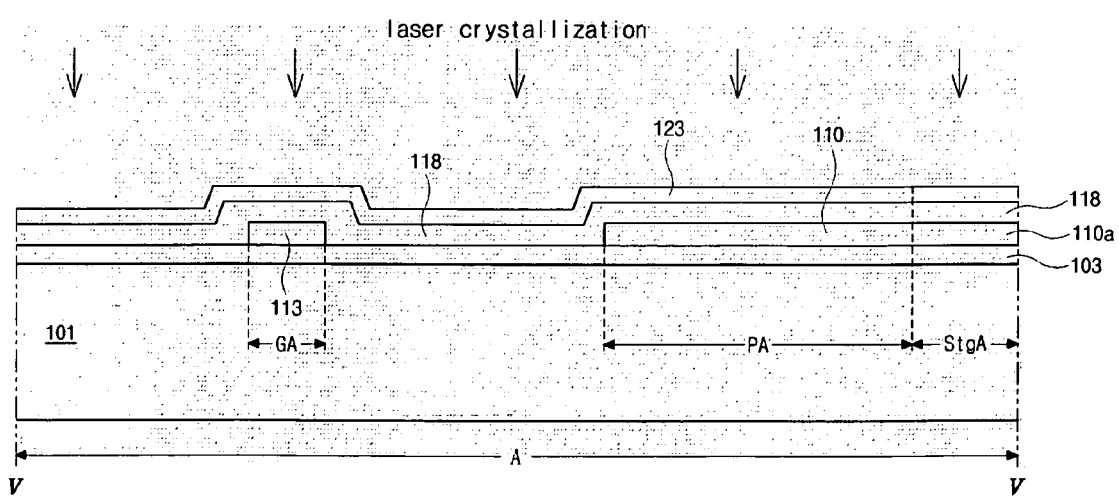
Figure 5F:
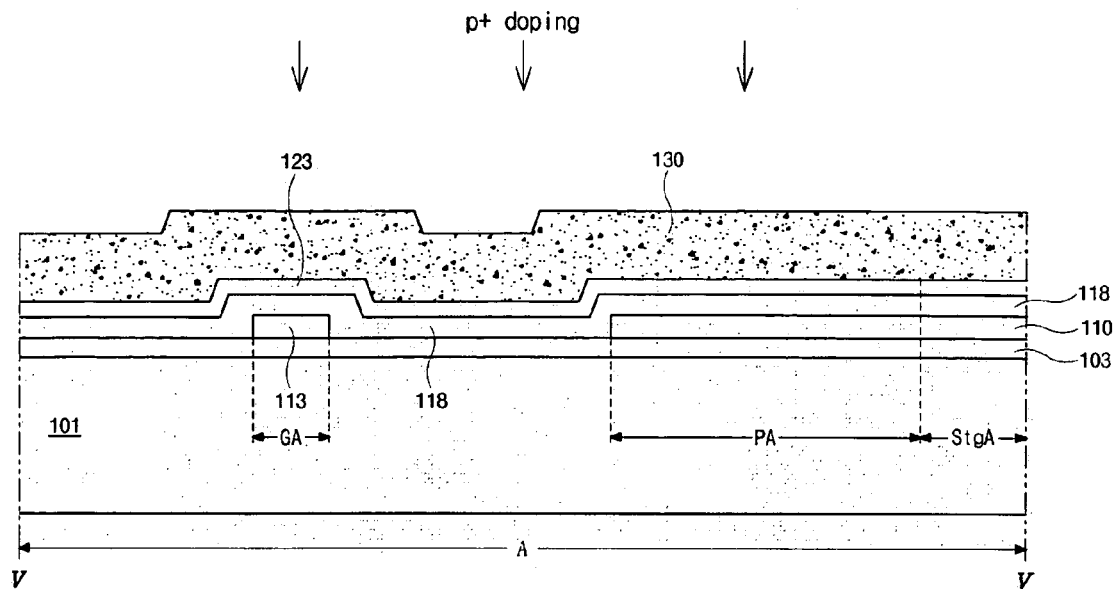

In FIGS. 5D, 6D, 7D and 8D, after etching the metallic material layer 107 and the transparent conductive material layer 106, portions of the first and second gate-pixel PR patterns 108a and 108b are removed. For example, the first and second gate-pixel PR patterns 108a and 108b may be anisotropically removed by a dry etching method such as ashing. As illustrated in FIG. 5D, the first gate-pixel PR pattern 108a (of FIG. 5C) is completely removed while a portion of second gate-pixel PR pattern 108b (of FIG. 6C) having a reduced thickness remains. Then, the metallic material pattern 107a is etched using the remaining second gate-pixel PR pattern 108b as an etching mask to expose the transparent conductive material pattern 106a (of FIG. 5C). Accordingly, a pixel electrode 110 and a first capacitor electrode 110a of the transparent conductive material pattern 106a (of FIG. 5C) are formed in the pixel TFT portion "A," and a gate pad 116 of the transparent conductive material pattern 106a (of FIG. 7C) is formed in the gate pad area "GPA." In addition, first gate electrode 113 of the transparent conductive material pattern 106a (of FIG. 6C) is formed in the gate electrode areas "GA" of the pixel TFT portion "A." Second gate electrode 114 of the transparent conductive material pattern 106a (of FIG. 8C) is formed in the n-type driving TFT portion "B." Furthermore, third gate electrode 115 of the transparent conductive material pattern 106a (of FIG. 8C) is formed in the p-type driving TFT portion "C." As a result, the pixel electrode 110, the first capacitor electrode 110a, the gate pad 116 and the first, second and third gate electrodes 113, 114 and 115 include a transparent conductive material.

Figure 6D:
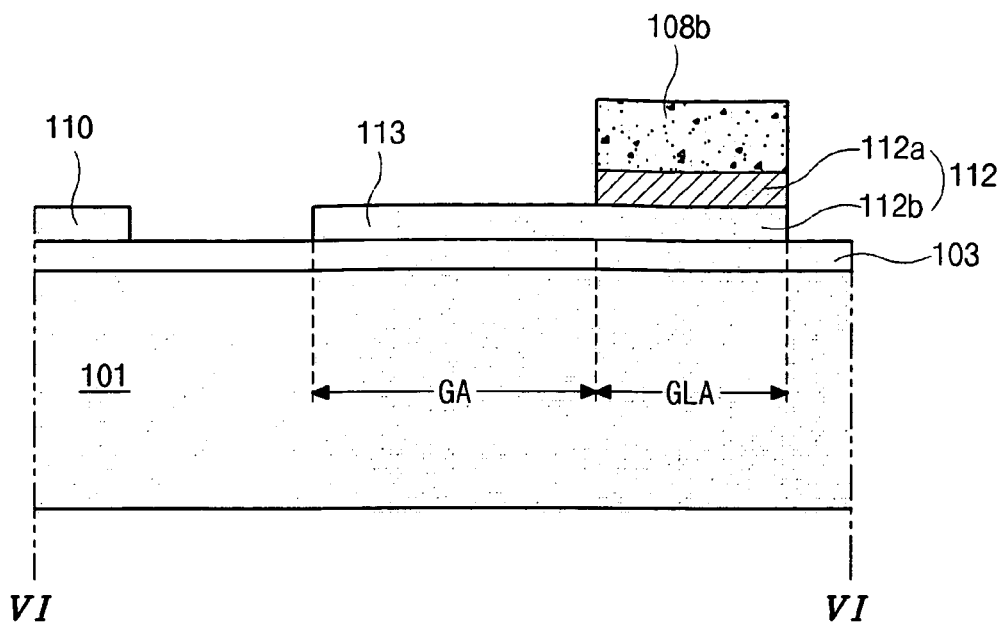
Figure 6E:
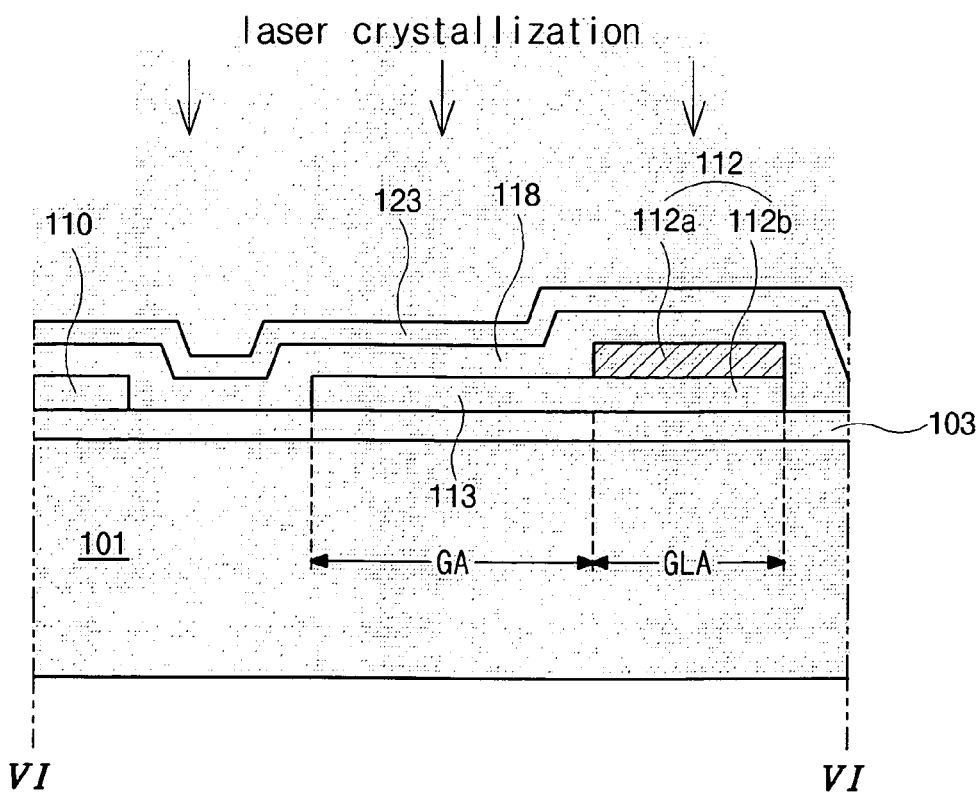
Figure 6F:
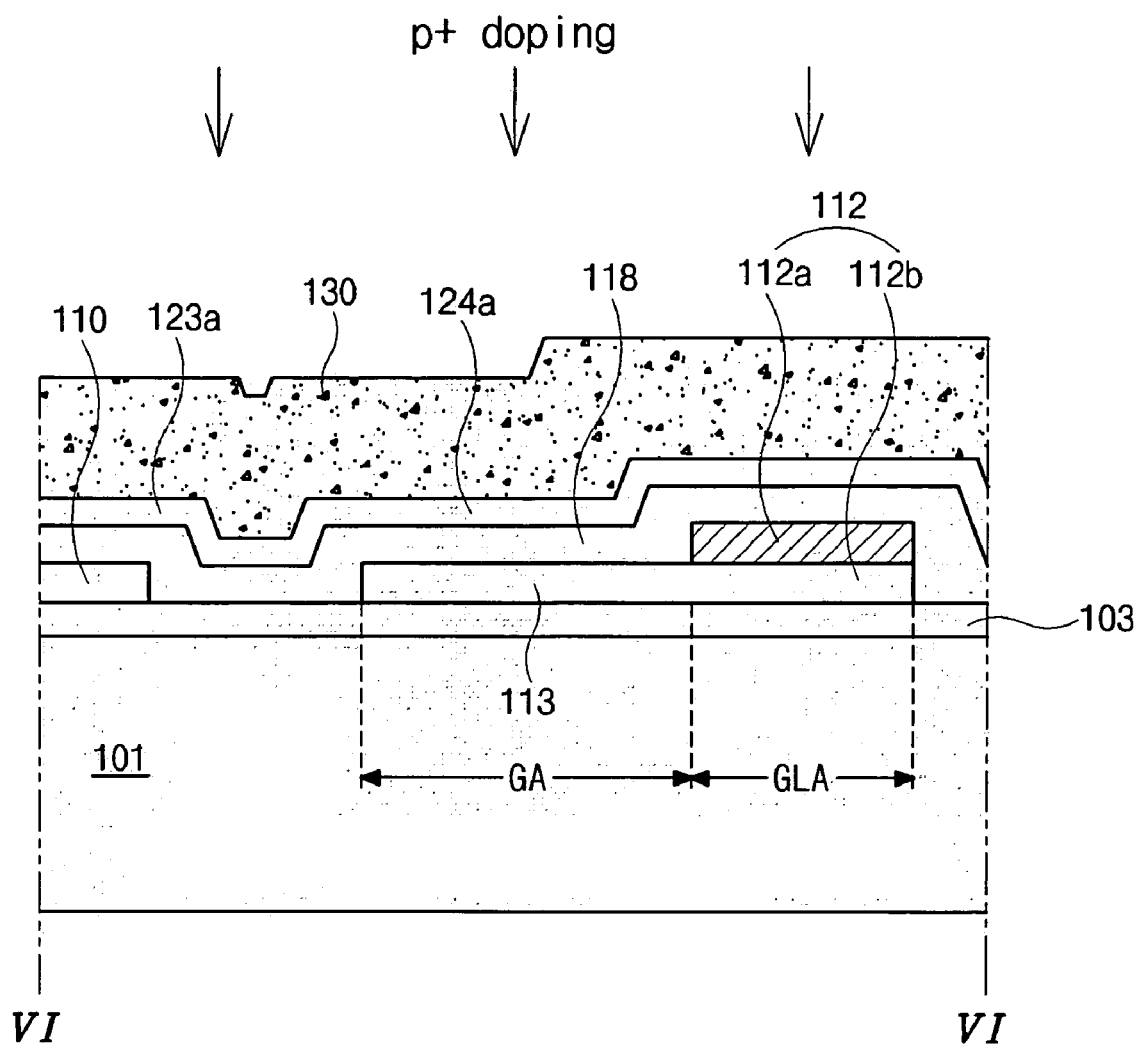
Figure 6G:
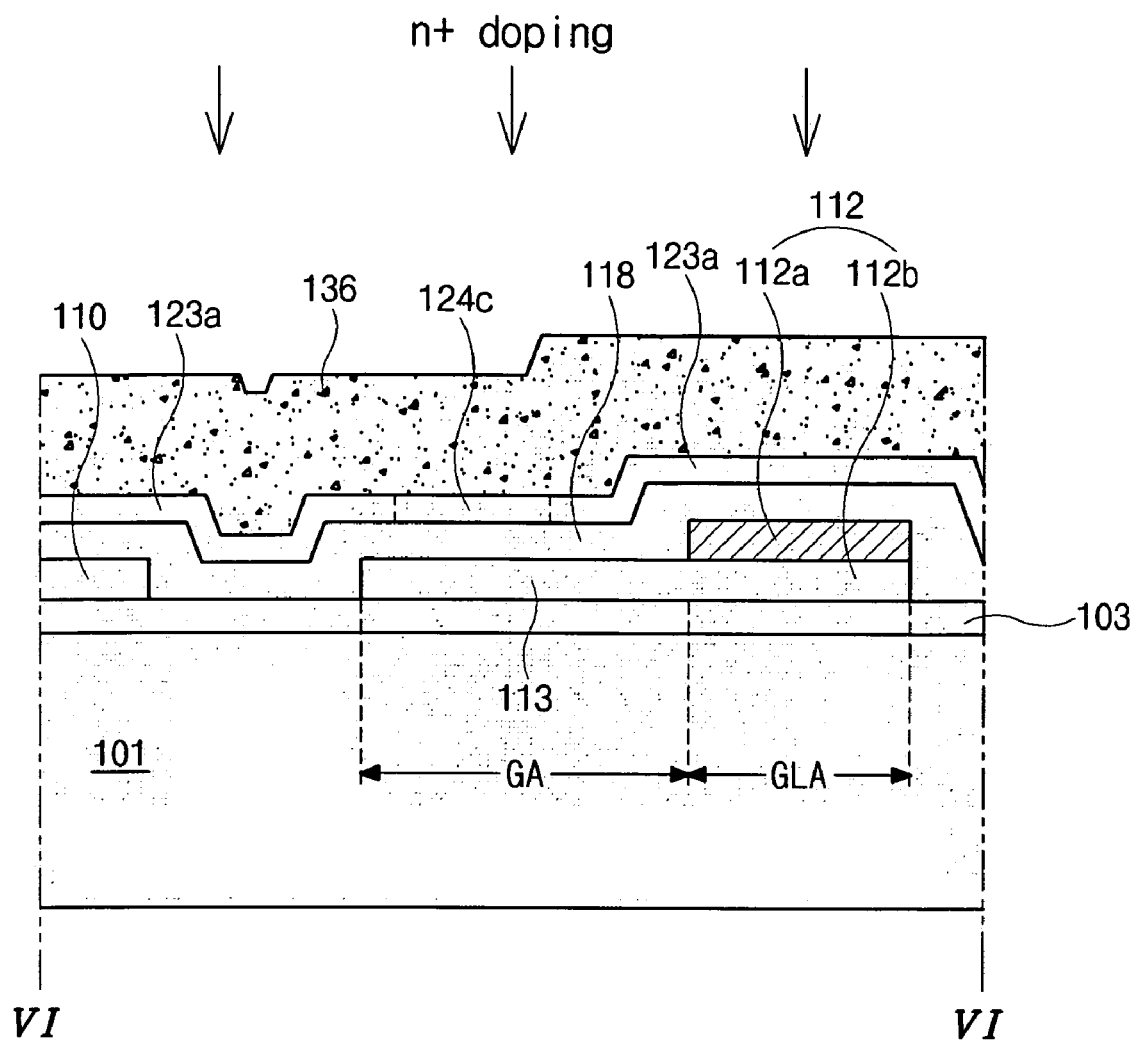
Figure 6H:
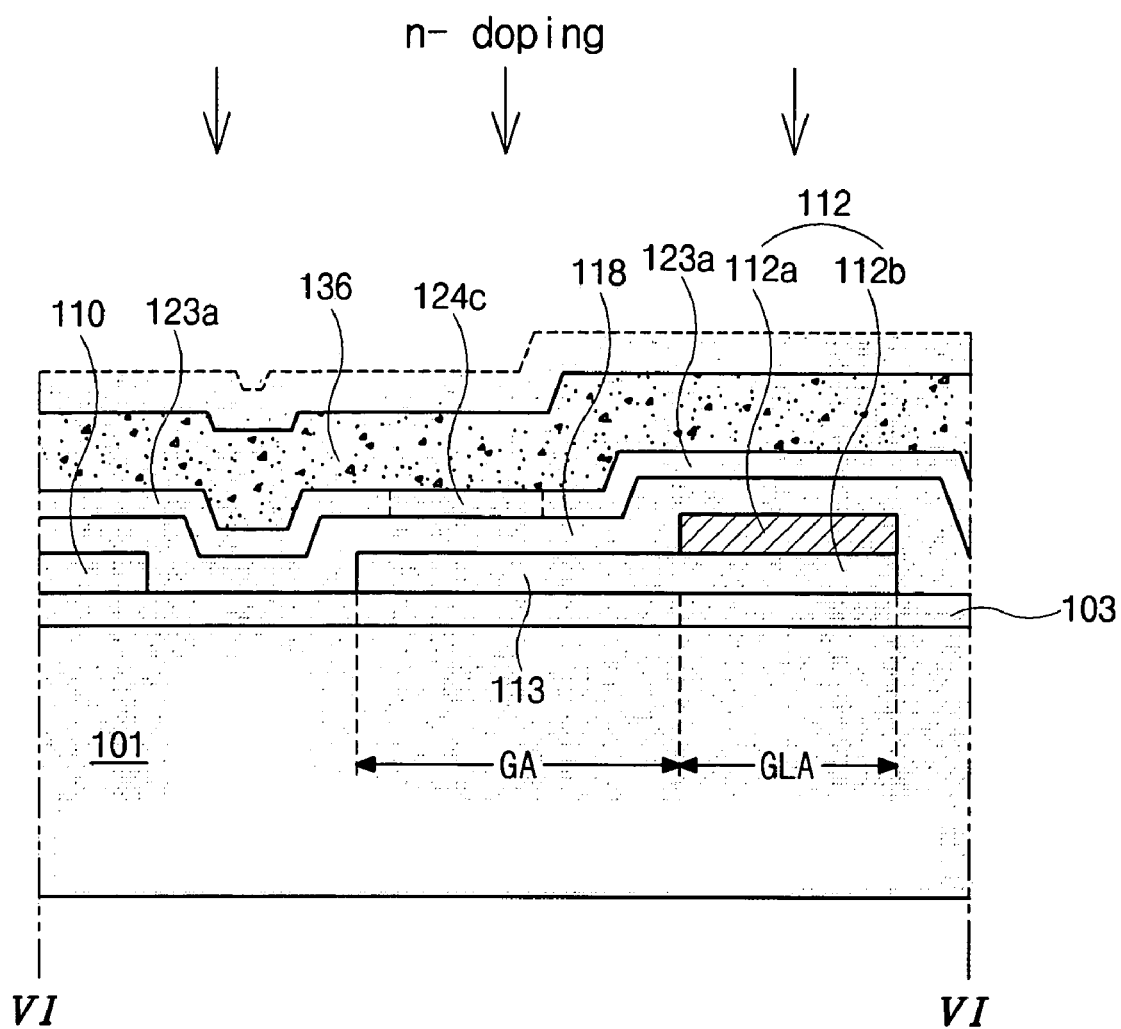
Figure 6I:
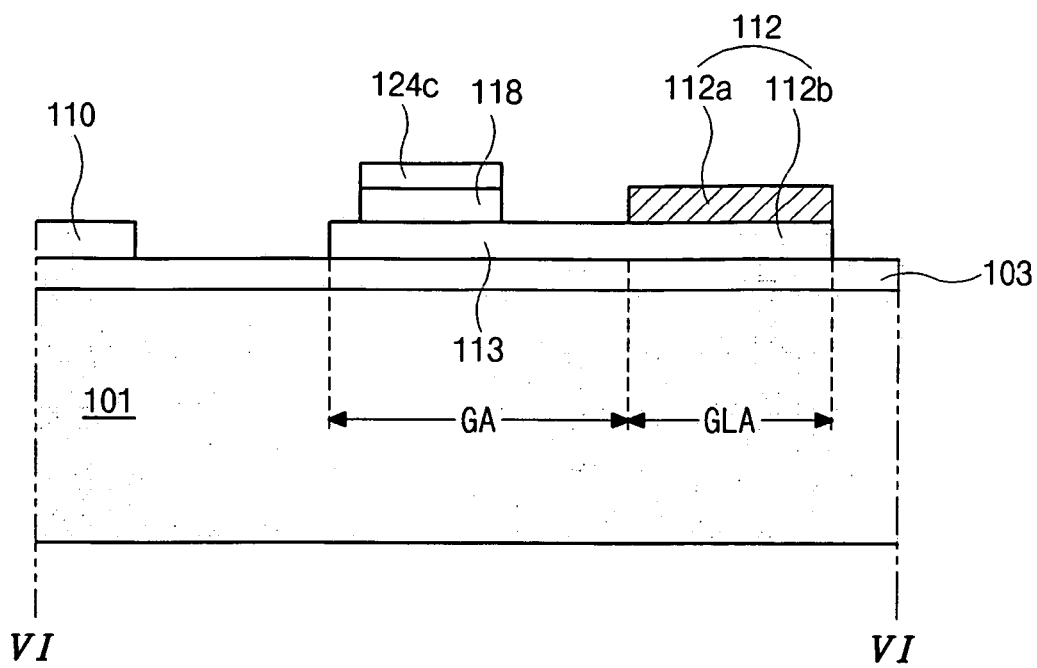
Figure 6J:
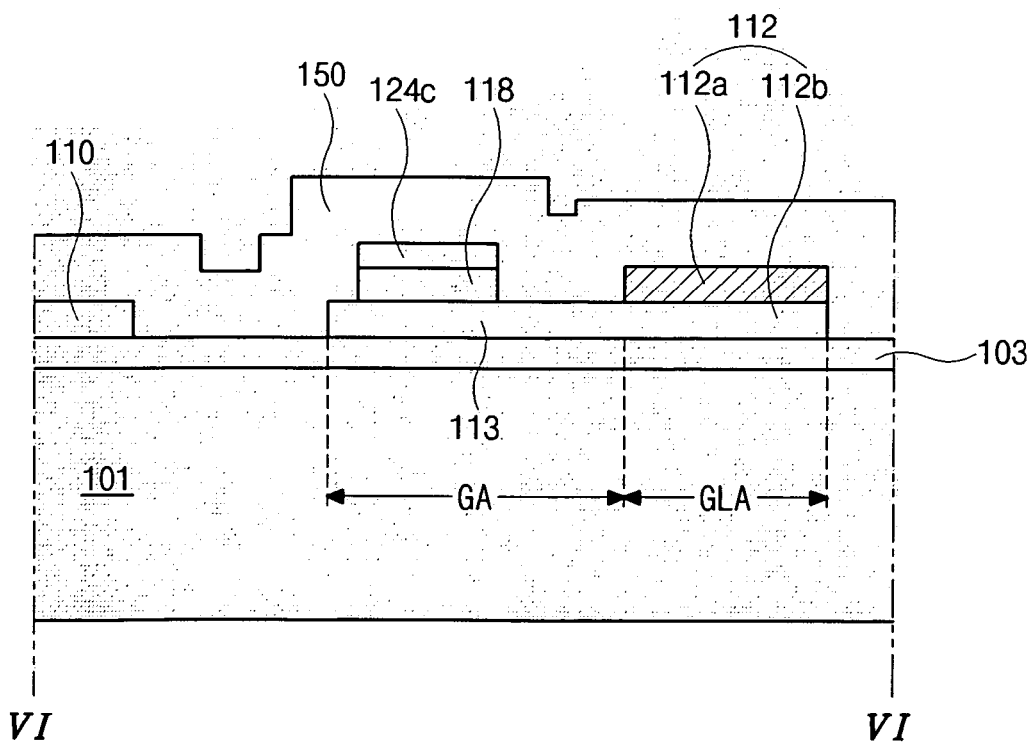
Figure 6K:
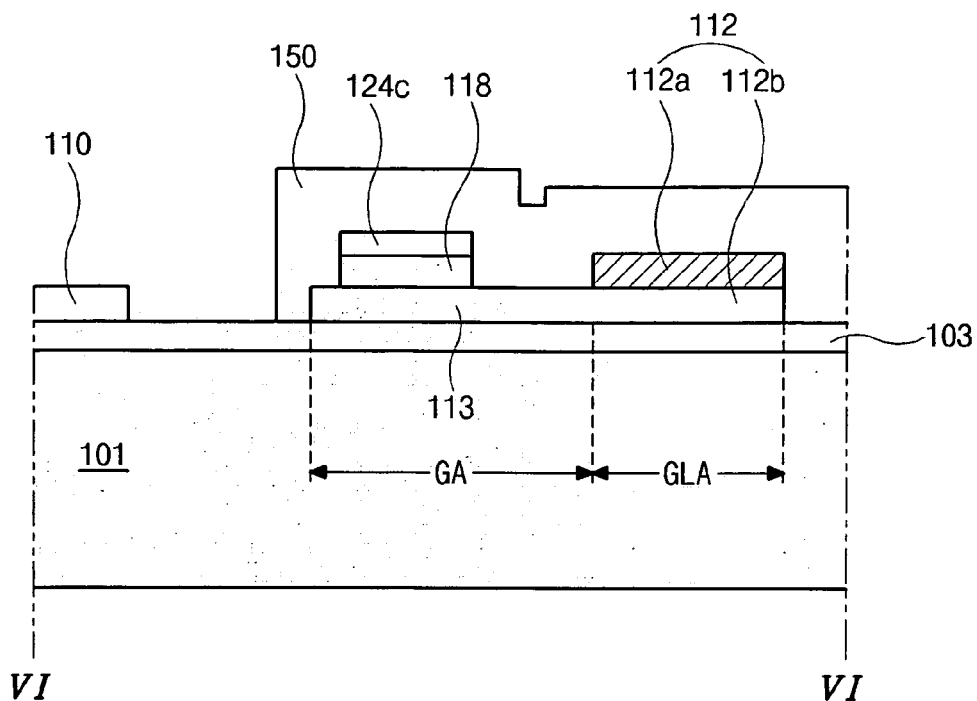
Figure 6L:
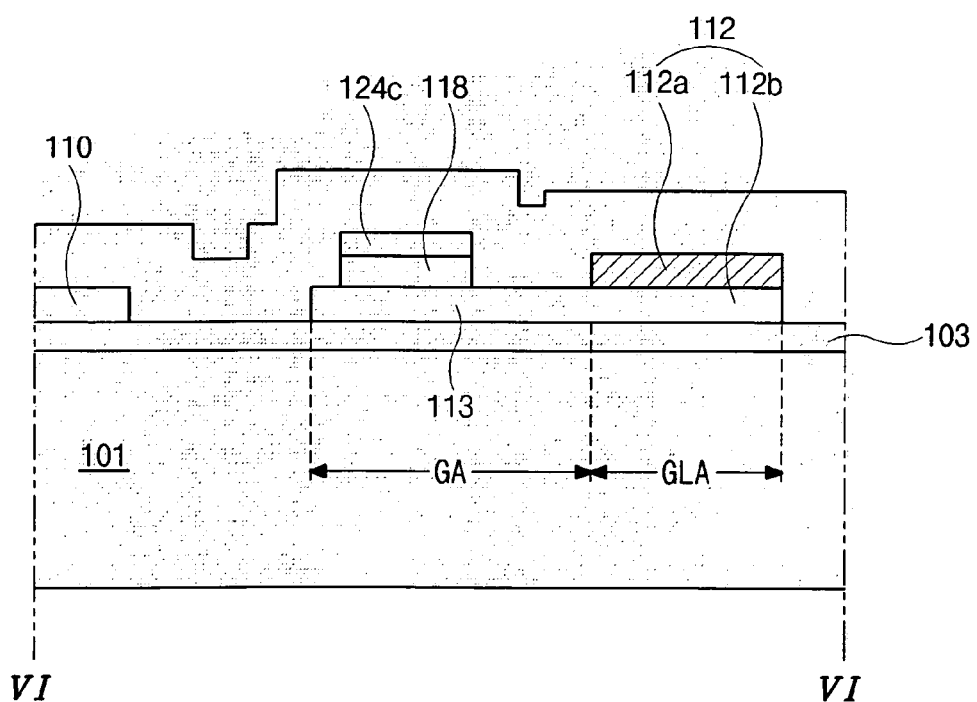

As illustrated in FIG. 6D, because the portion of second gate-pixel PR pattern 108b still remains, a gate line 112 including a metallic material pattern 112a and a transparent conductive material pattern 112b are formed in the gate line area "GLA." Accordingly, the resistance increase of the gate line 112 is prevented. Furthermore gate line delay due to this resistance increase is also prevented. In addition, because each of the first, second and third gate electrodes 113, 114 and 115 include a single layer of a transparent conductive material, a size of a step at edge portions of each of the gate electrodes 113, 114 and 115 becomes small. In a subsequent process, an amorphous silicon layer is formed on the gate electrodes 113, 114 and 115, and then the amorphous silicon layer may be crystallized to a polycrystalline silicon layer through a laser annealing method. As compared to the smaller step at edge portions of each of the gate electrodes 113, 114 and 115, when edge portions include an increased step size, the increased size step may cause deterioration of the polycrystalline silicon layer during the crystallization process. However, in an embodiment, the size of the step for each of the gate electrodes 113, 114 and 115 are formed small enough to prevent the deterioration of the polycrystalline silicon layer.

In FIGS. 5E, 6E, 7E and 8E, after the first and second gate-pixel PR patterns 108a and 108b are removed, a gate insulating layer 118 is formed on the gate line 112, the first, second and third gate electrodes 113, 114 and 115, and the gate pad 116. The gate insulating layer 118 may include one of inorganic insulating materials such as silicon nitride ($SiN_x$) and silicon oxide ($SiO_2$). Thereafter, an amorphous silicon layer is formed on an entire surface of the gate insulating layer 118. The amorphous silicon layer is crystallized to a polycrystalline silicon layer 123 by irradiating a laser beam. The amorphous silicon layer may be crystallized through an excimer laser annealing (ELA) method or a sequential lateral solidification (SLS) method using an excimer laser having one of wavelengths 193 nm (ArF), 248 nm (KrF), 308 nm (XeCl), and 351 nm (XeF). Because each of the first, second and third gate electrodes 113, 114 and 115 are formed of a single layer of a transparent conductive material, the step size formed at each of the gate electrodes 113, 114 and 115 on the substrate 101 is reduced. Accordingly, deterioration of the polycrystalline silicon layer during the crystallization process through ELA method or SLS method is prevented and crystallinity of the polycrystalline silicon layer is improved.

In FIGS. 5F, 6F, 7F and 8F, first and second p+ PR patterns 131 and 130 are formed on the polycrystalline silicon layer 123 through a second mask process. The first p+ PR pattern 131 covers a first portion 126b of the polycrystalline silicon layer 123 corresponding to the gate electrode 115 in the p-type driving TFT portion "C." A second portion 126a of the polycrystalline silicon layer 123 at both sides of the first portion 126b in the p-type driving TFT portion "C" is exposed. In addition, the second p+ PR pattern 130 covers the entire polycrystalline silicon layer 123 in the pixel TFT portion "A," the gate line area "GLA," the gate pad area "GPA", and the n-type driving TFT portion "B."

Figure 7A:
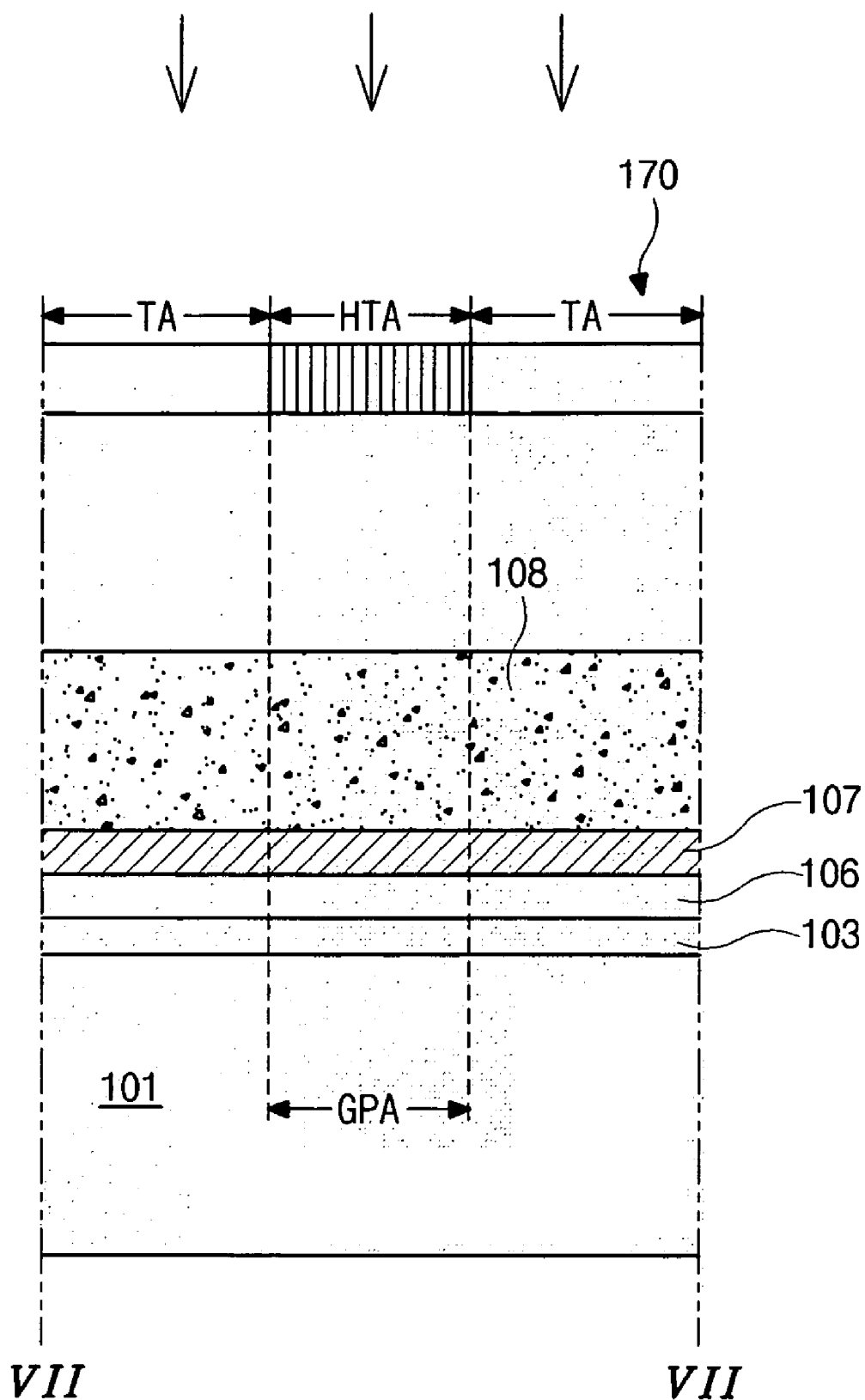
FIGS. 7A to 7L are schematic cross-sectional views taken along line "VII-VII" of FIG. 4 illustrating a gate pad in a non-display area of an array substrate according to an exemplary embodiment of the present invention.
Figure 7B:
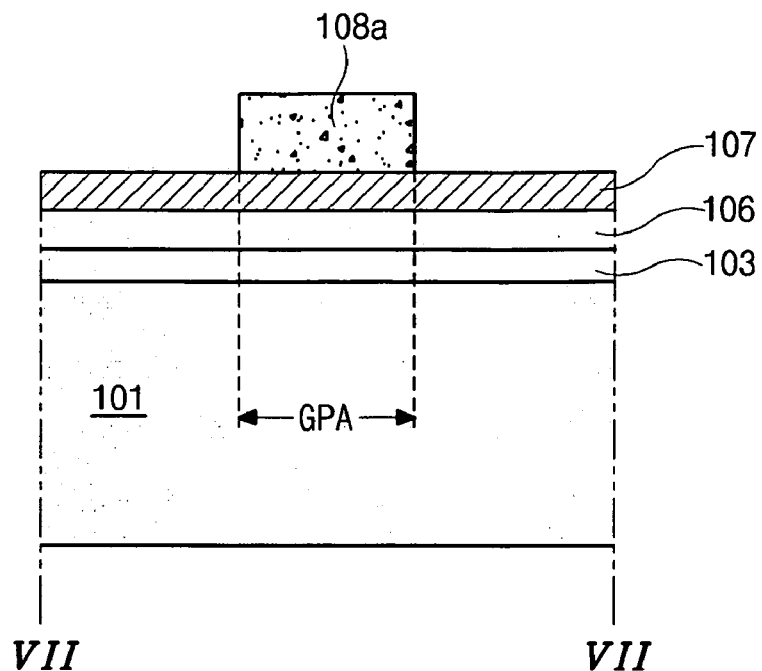
Figure 7C:
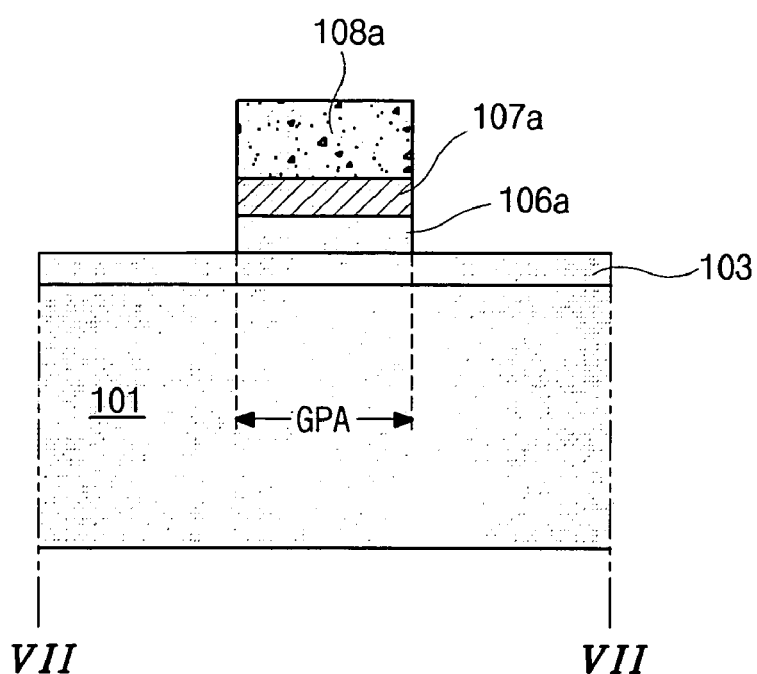
Figure 7D:
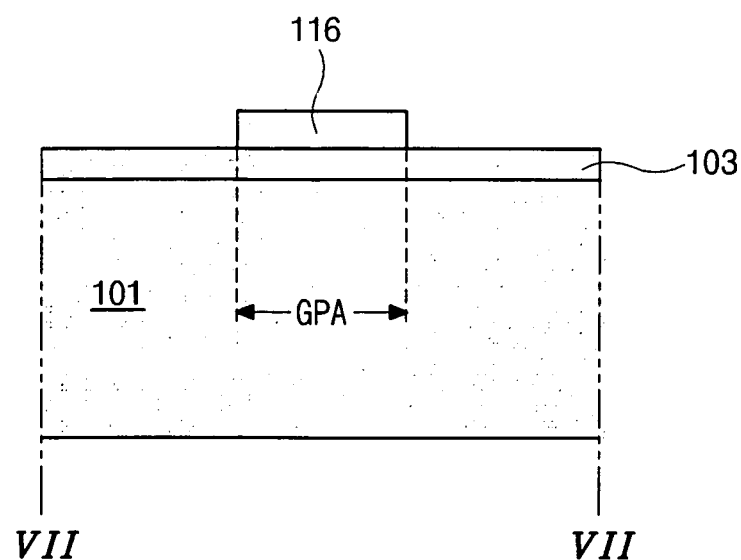
Figure 7E:
Figure 7E:
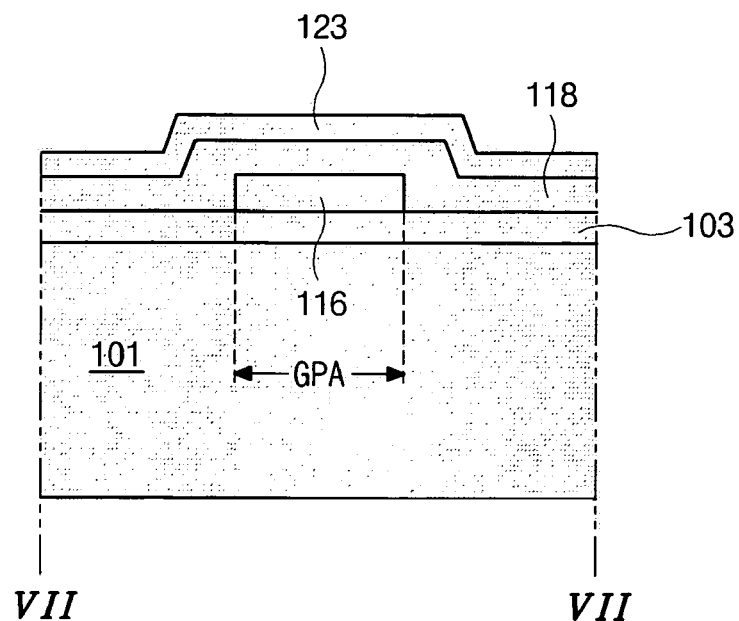
Figure 7F:
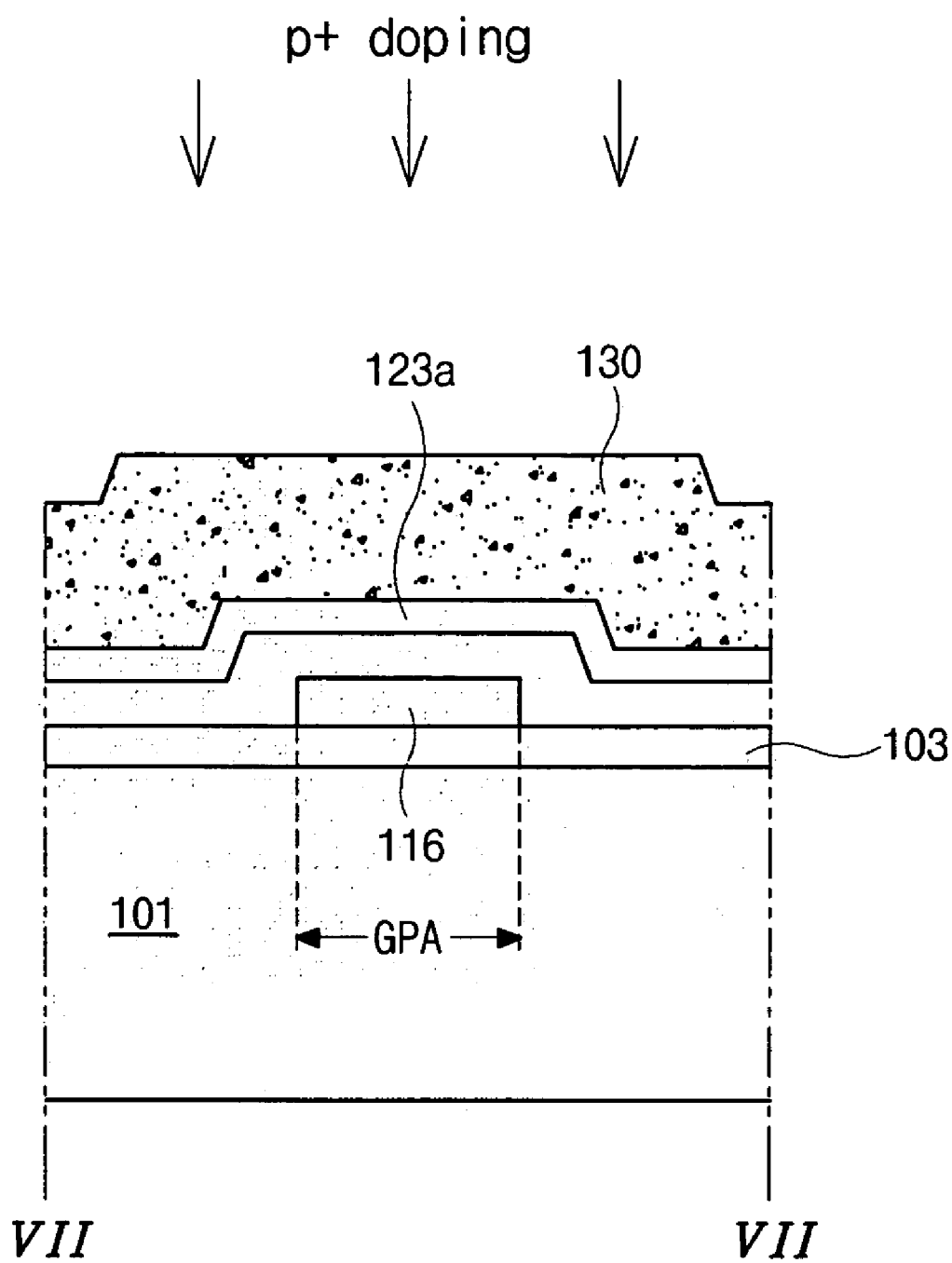
Figure 7G:
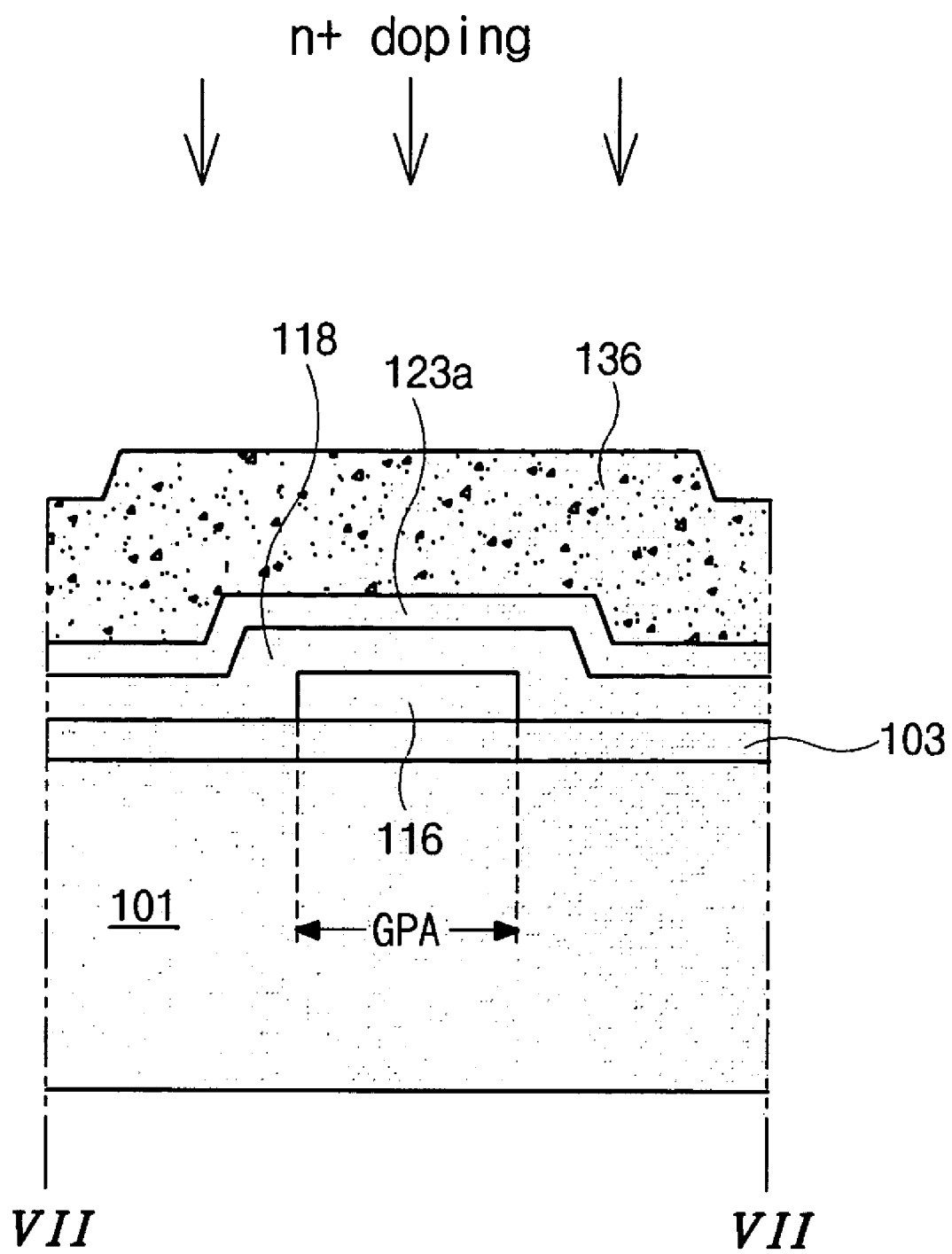
Figure 7H:
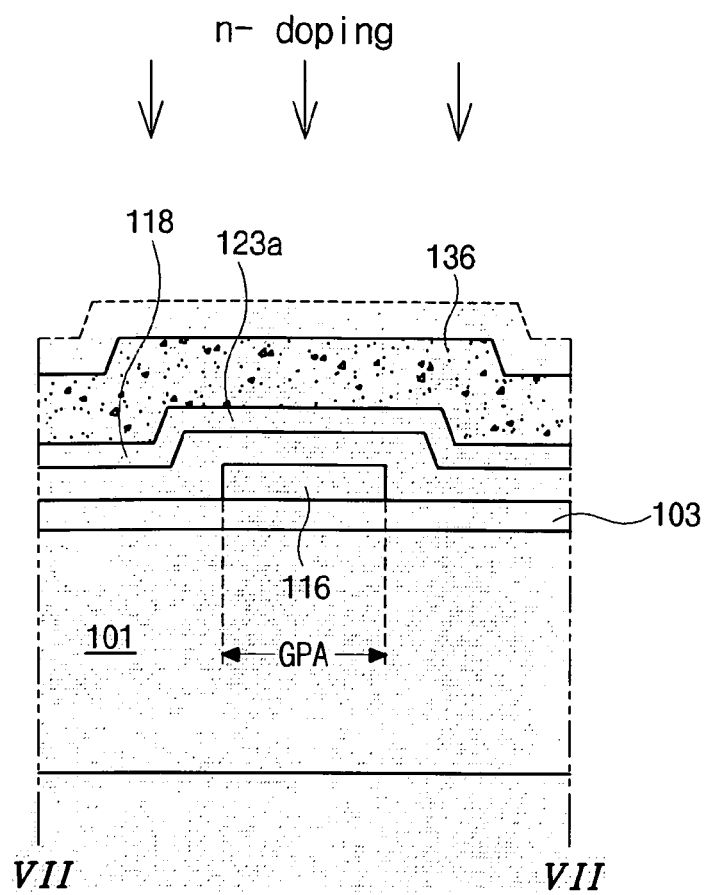
Figure 7I:
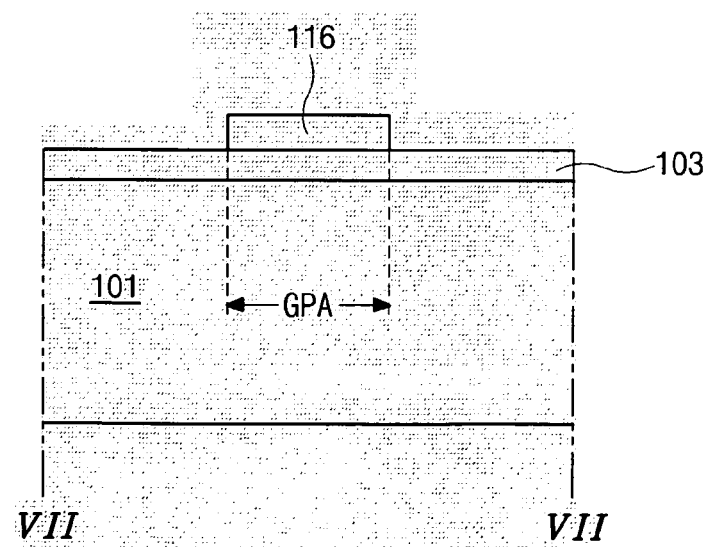
Figure 7J:
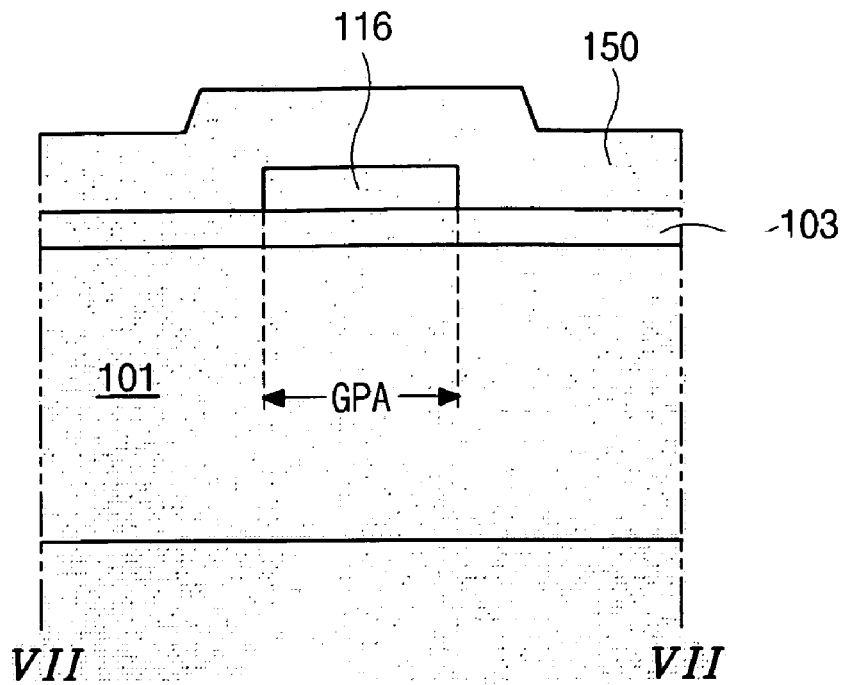
Figure 7K:
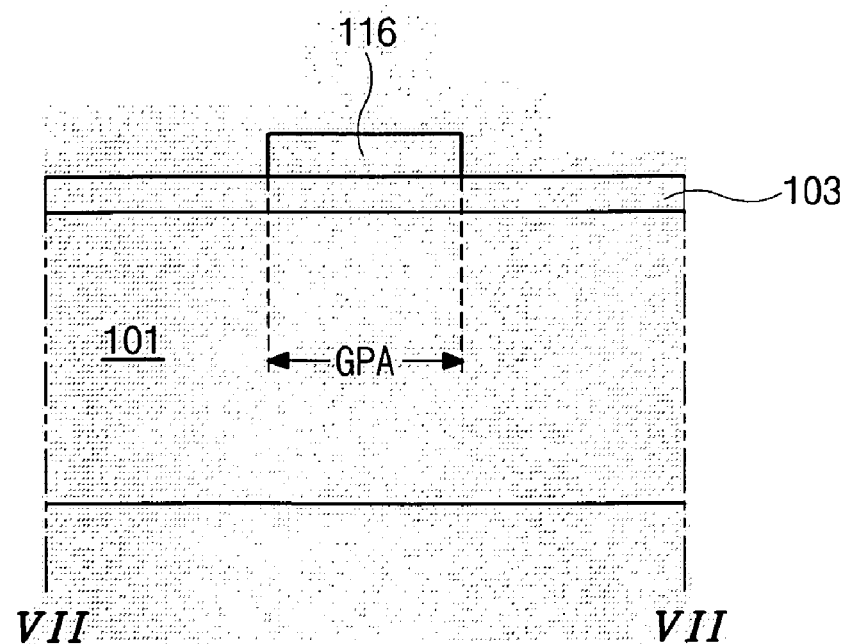
Figure 8A:
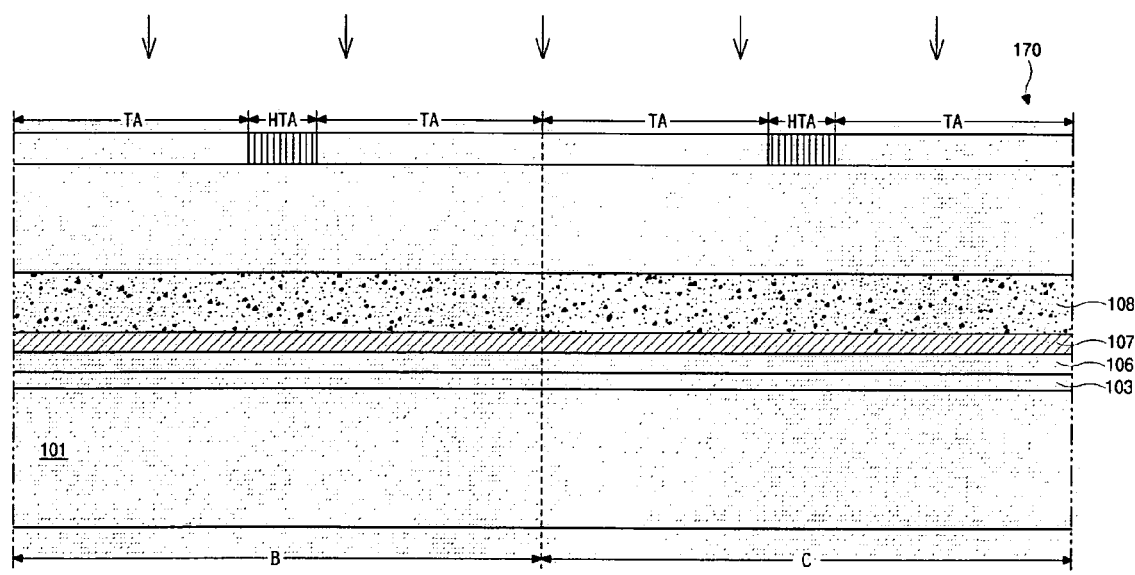
FIGS. 8A to 8L are schematic cross-sectional views illustrating a fabricating process of n-type and p-type driving thin film transistors in a driving area of an array substrate according to an exemplary embodiment of the present invention.
Figure 8B:
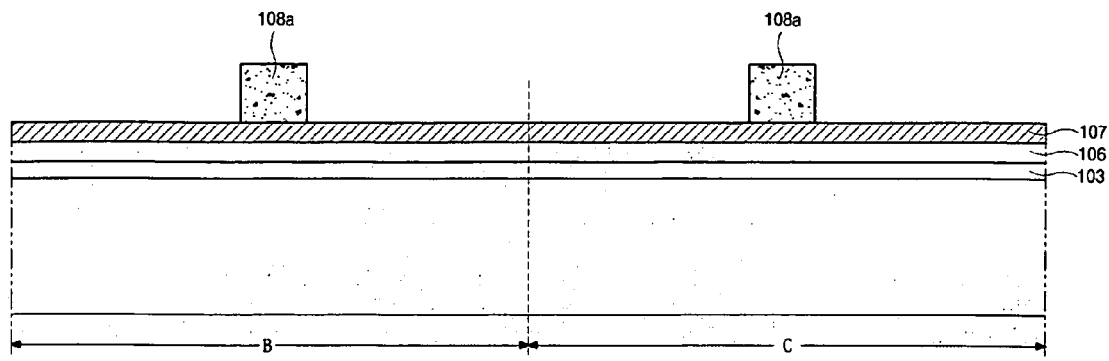
Figure 8C:
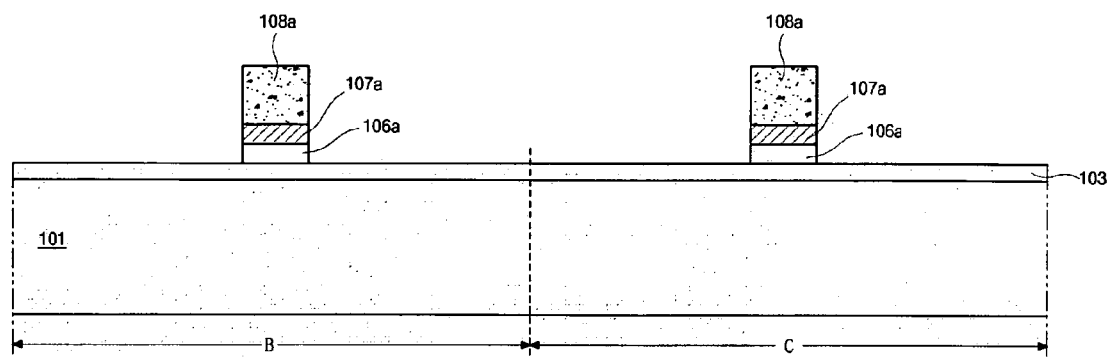
Figure 8D:
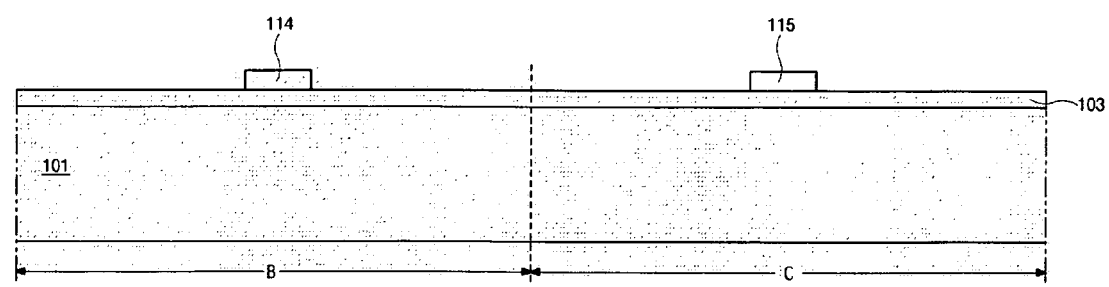
Figure 8E:
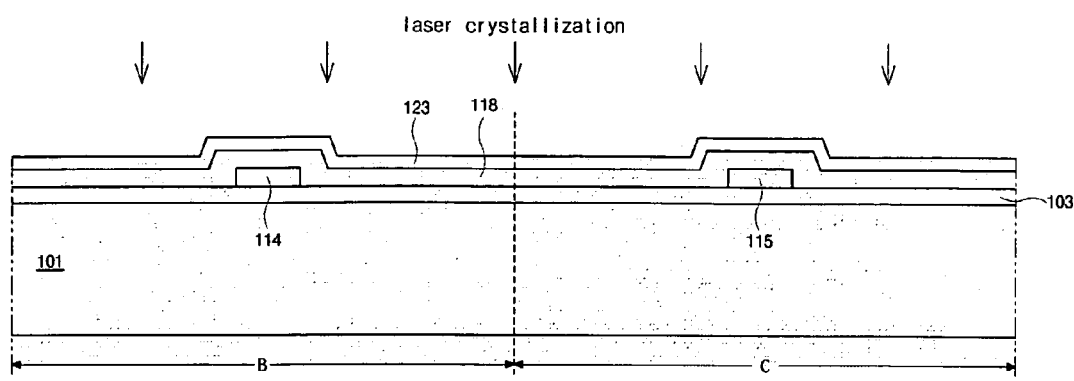
Figure 8F:
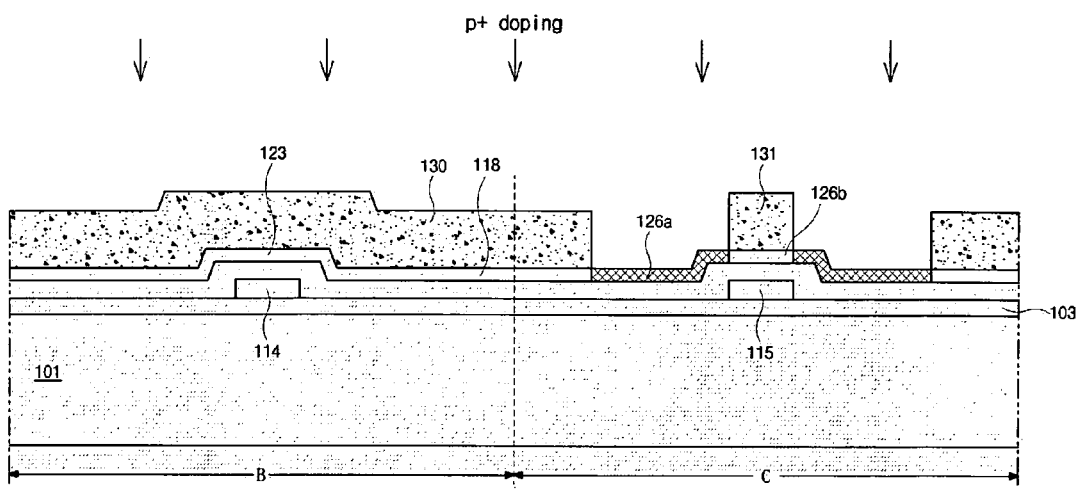

Next, the polycrystalline silicon layer 123 is doped with high concentration p-type impurities (p+) using the first and second p+ PR patterns 131 and 130 as doping masks. For example, the concentration of the p-type impurities may be within a range of about $1 \times 10^{15}$ $cm^{-2}$ to about $9 \times 10^{16}$ $cm^{-2}$. Accordingly, as illustrated in FIG. 8F, the second portion 126a of the polycrystalline silicon layer 123 in the p-type driving TFT portion "C" is doped with the high concentration p-type impurities (p+) to function as a p-type ohmic contact region, while the first portion 126b is not doped with the high concentration p-type impurities (p+). The first portion 126b functions as an intrinsic silicon layer. Similarly, the polycrystalline silicon layer 123 in the pixel TFT portion "A" of FIG. 5F, the n-type driving TFT portion "B" of FIG. 8F, and the gate pad area "GPA" of FIG. 7F, are not doped with the high concentration p-type impurities (p+) to remain as an intrinsic layer. After doping with the high concentration p-type impurities (p+), the first and second p+ PR patterns 131 and 130 are removed by a dry etching method such as ashing or a wet etching method such as stripping.

Figure 5G:
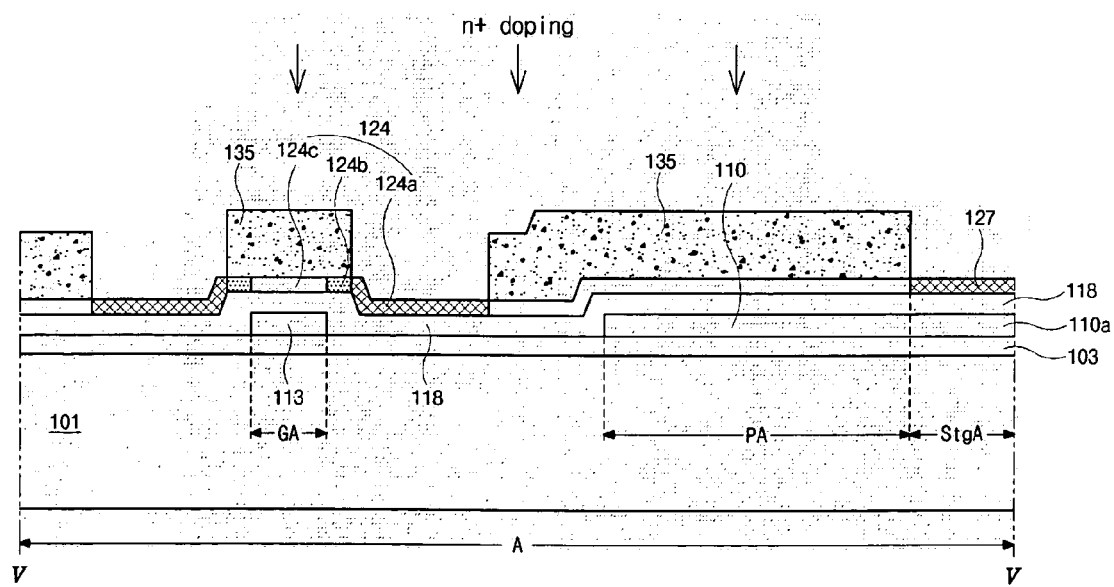
Figure 8G:
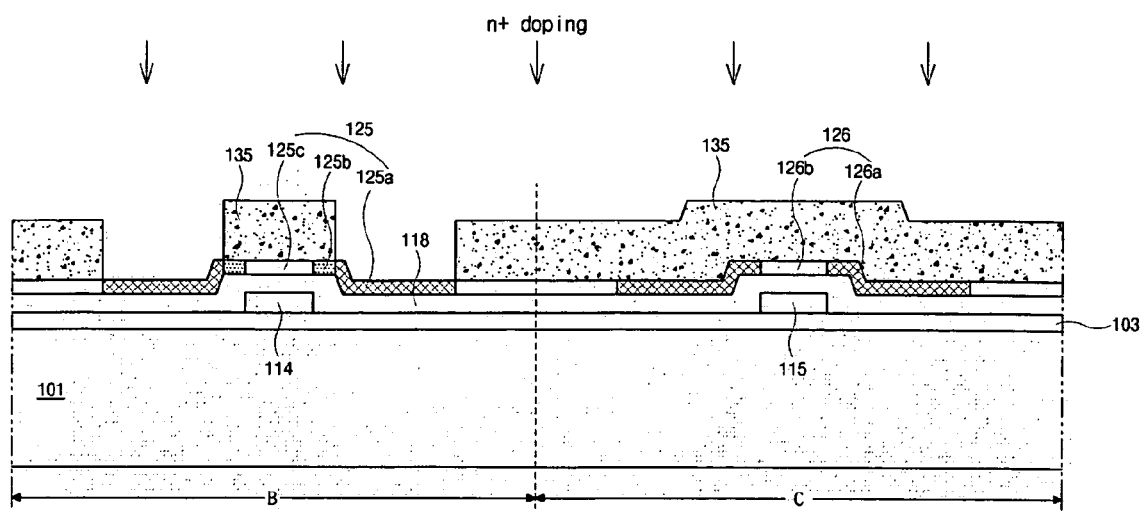

In FIGS. 5G, 6G, 7G and 8G, first and second n+ PR patterns 135 and 136 are formed on the polycrystalline silicon layer 123 through a third mask process. As illustrated in FIG. 5G and FIG. 8G, first portions 124a and 125a of the polycrystalline silicon layer 123 in the pixel TFT portion "A" (of FIG. 5G) and the n-type driving TFT portion "B" (of FIG. 8 G) are exposed through the first and second n+ PR patterns 135 and 136. In addition, the first n+ PR pattern 135 covers second and third portions 124b, 124c, 125b and 125c of the polycrystalline silicon layer 123 in the pixel TFT portion "A" and the n-type driving TFT portion "B." The third portions 124c and 125c correspond to the first gate electrode 113 in the pixel TFT portion "A" and the second gate electrode 114 in the n-type driving TFT portion "B," respectively. Furthermore, the second portions 124b formed between the first portion 124a and the third portion 124c of FIG. 5G have a width matched to a lightly doped drain (LDD) length. Similarly, the second portions 125b formed between the first portion 125a and the third portion 125c of FIG. 8G have a width matched to a lightly doped drain (LDD) length.

As illustrated in FIG. 5G, a portion of the polycrystalline silicon layer 123 in the pixel electrode area "PA" is covered with the second n+ PR pattern 135, while a portion of the polycrystalline silicon layer 123 in the storage capacitor area "StgA" is exposed. In addition, the second n+ PR pattern 136 covers the entire polycrystalline silicon layer 123 in the gate line area "GLA" of FIG. 6G, the gate pad area "GPA" of FIG. 7G, and the n-type driving TFT portion "B" of FIG. 8G.

Next, the polycrystalline silicon layer 123 is doped with high concentration n-type impurities (n+) using the first and second n+ PR patterns 135 and 136 as doping masks. For example, the concentration of the n-type impurities may be within a range of about $1 \times 10^{15}$ $cm^{-2}$ to about $9 \times 10^{16}$ $cm^{-2}$. Accordingly, the first portions 124a and 125a in the pixel TFT portion "A" and the n-type driving TFT portion "B" are doped with the high concentration n-type impurities (n+) to function as an n-type ohmic contact region, while the second and third portions 124b, 124c, 125b and 125c are not doped with the high concentration n-type impurities (n+) to remain as an intrinsic silicon layer. Similarly, the polycrystalline silicon layer 123 in the storage capacitor area "StgA" is doped with the high concentration n-type impurities (n+) to be a second capacitor electrode 127 of n+ doped polycrystalline silicon. The second capacitor electrode 127 is a portion of the common line.

Figure 5H:
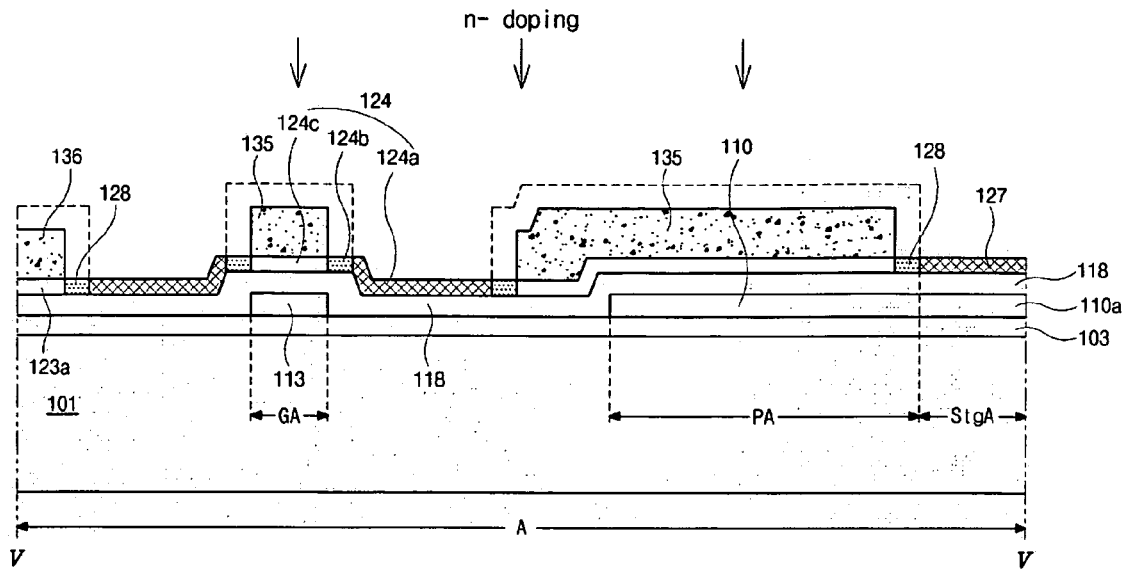
Figure 8H:
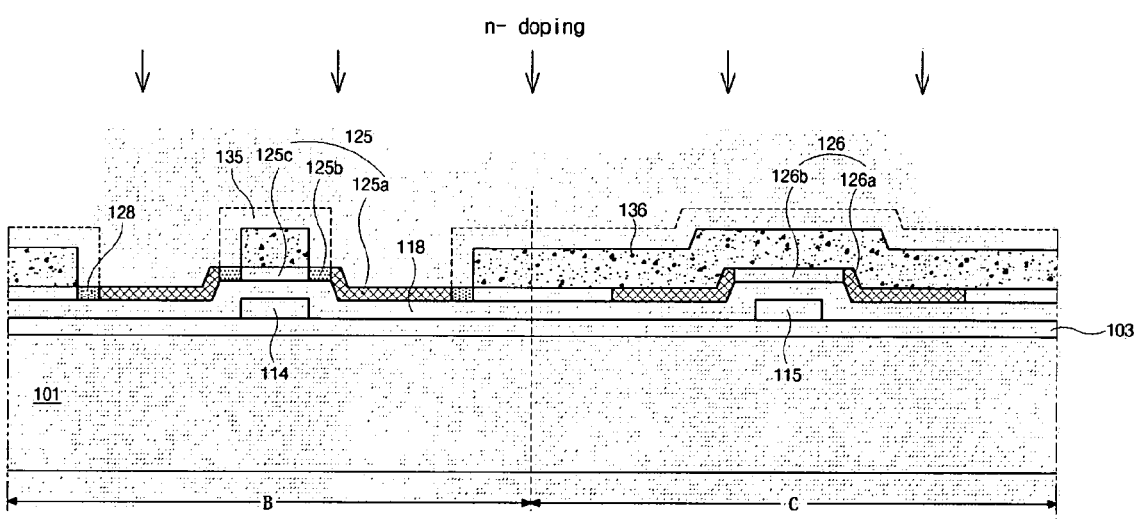

In FIGS. 5H, 6H, 7H and 8H, after doping with the high concentration n-type impurities (n+), portions of the first and second n+ PR patterns 135 and 136 are removed. For example, the first and second n+ PR patterns 135 and 136 may be isotropically removed by a dry etching method such as ashing or a wet etching method such as stripping. Accordingly, a side portion and a top portion of the first and second n+ PR patterns 135 and 136 may be equally removed. As a result, as illustrated in FIG. 5H and FIG. 8H, the second portions 124b and 125b in the pixel TFT portion "A," the n-type driving TFT portion "B" and a side portion 128 in the pixel electrode area "PA" are exposed, and a thickness of the first and second n+ PR patterns 135 and 136 is reduced.

Next, the polycrystalline silicon layer 123 is doped with low concentration n-type impurities (n−) using the reduced first and second n+ PR patterns 135 and 136 as doping masks. For example, the concentration of the n-type impurities may be within a range of about $1 \times 10^{13}$ $cm^{-2}$ to about $9 \times 10^{13}$ $cm^{-2}$. Accordingly, as illustrated in FIG. 5H, the first portion 124a and the second portion 124b of the polycrystalline silicon layer 123, a side portion 128 in the pixel electrode area "PA," and the second capacitor electrode 127 in the storage capacitor area "StgA" of the pixel TFT portion "A" are doped with the low concentration n-type impurities (n–). Similarly, as illustrated in FIG. 8H, the first portion 125a and the second portion 125b in the polycrystalline silicon layer 123, and the side portion 128 in the n-type driving TFT portion "B" are doped with the low concentration n-type impurities (n–). After doping with the low concentration n-type impurities (n–), the first and second n+ PR patterns 135 and 136 having the reduced thickness are removed by a dry etching method such as ashing or a wet etching method such as stripping.

Because the first portions 124a and 125a of the polycrystalline silicon layer 123 in the pixel TFT portion "A," the n-type driving TFT portion "B," and the second capacitor electrode 127 in the storage capacitor area "StgA" are already doped with the high concentration n-type impurities (n+), the impurity concentration thereof is not affected by the low concentration n-type impurities (n–) doping and remains as a high concentration. In addition, the side portion 128 in the pixel electrode area "PA" is removed in a subsequent process. As a result, the second portions 124b and 125b in the pixel TFT portion "A" and the n-type driving TFT portion "B" are doped with the low concentration n-type impurities (n–) to be LDD regions. The LDD regions distribute a strong electric field to a weak electric field, thereby hot carriers are reduced and leakage current is prevented. Accordingly, the LDD regions are formed in an n-type TFT and disposed between an ohmic contact region of n+ impurity-doped silicon and an active region of intrinsic silicon.

Figure 5I:
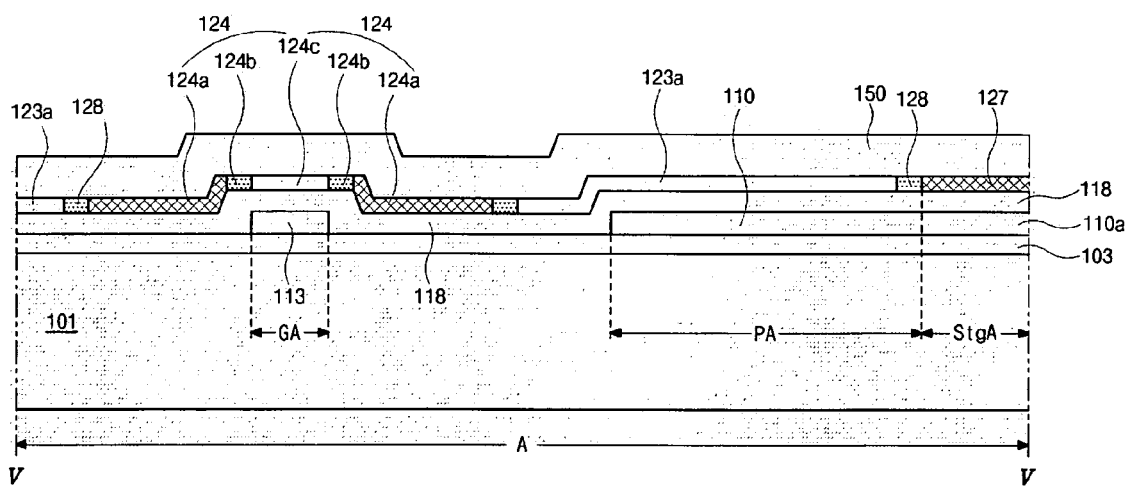
Figure 5J:
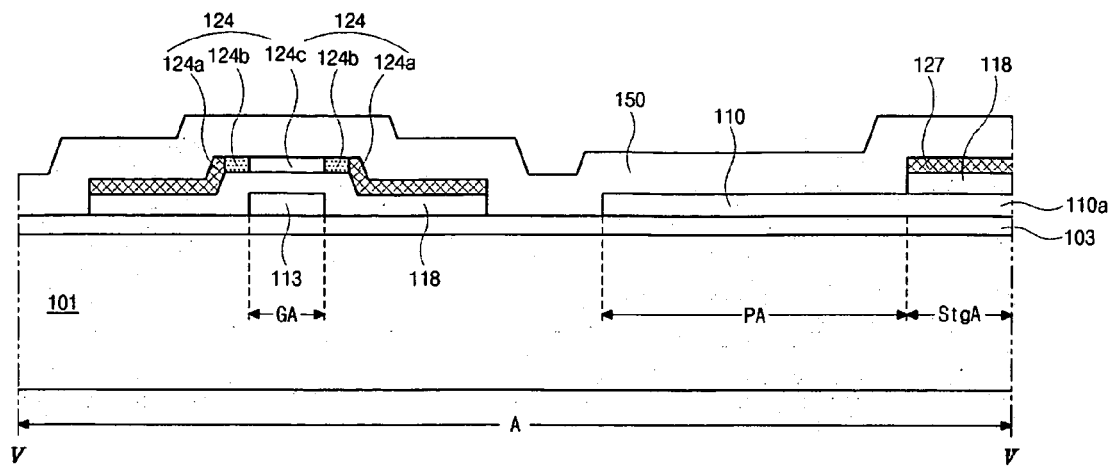
Figure 5K:
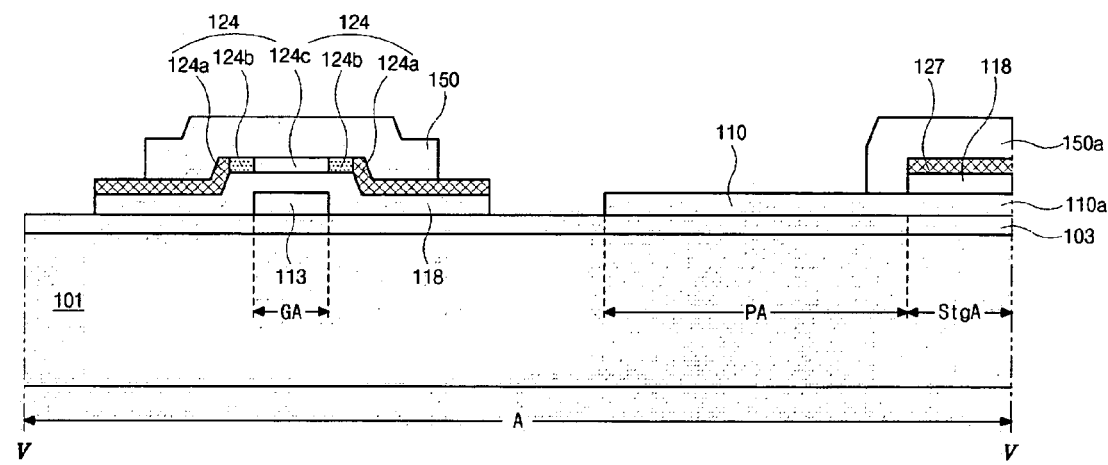
Figure 8I:
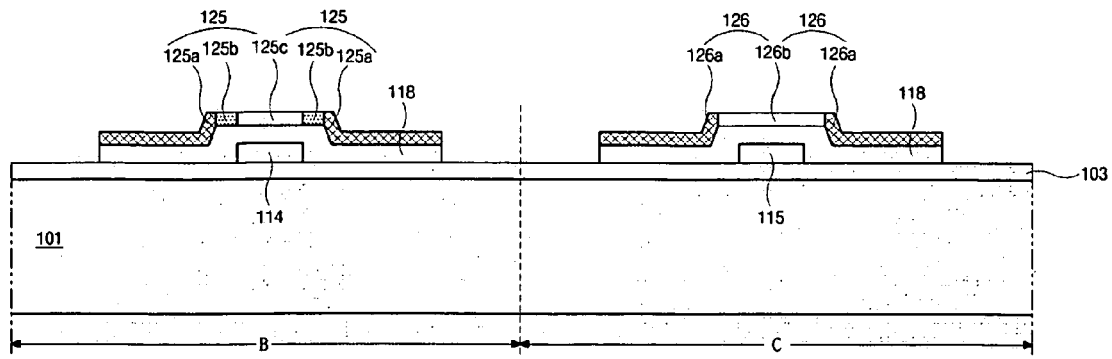
Figure 8J:
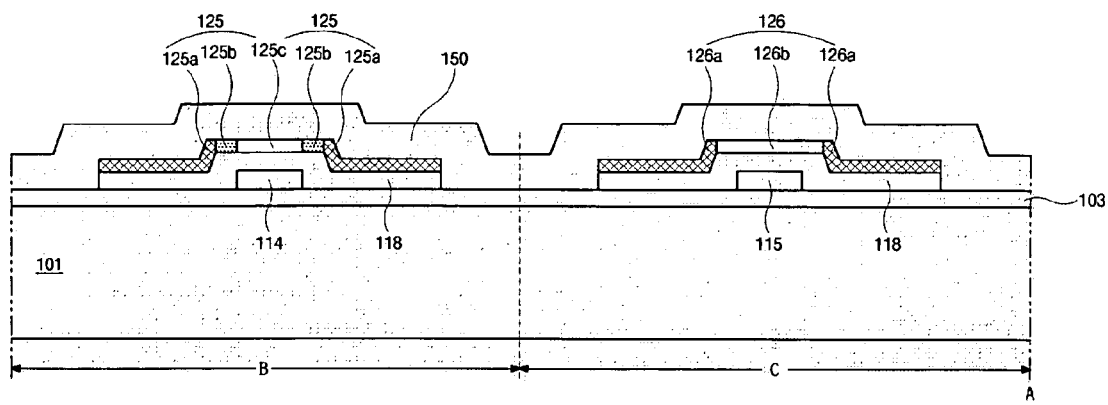
Figure 8K:
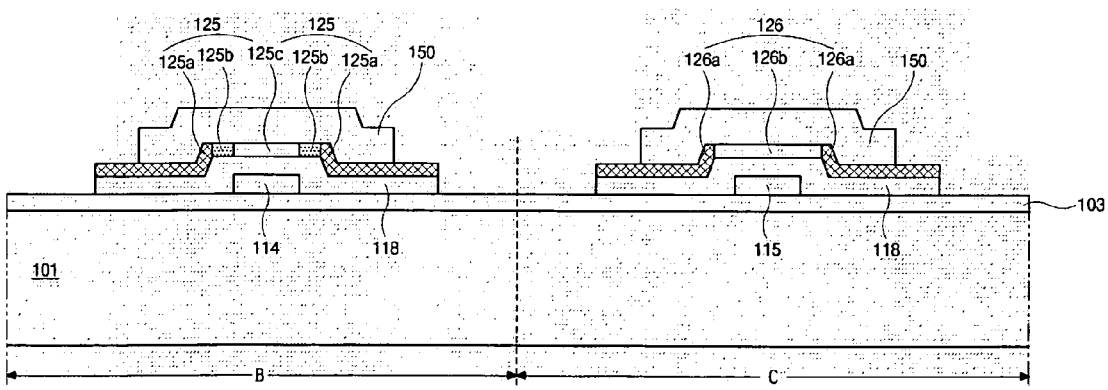

Through a plurality of doping processes including the p+ impurities, the n+ impurities and the n– impurities, n-type TFTs in the pixel TFT portion "A" of FIG. 5I, the n-type driving TFT portion "B" and a p-type TFT in the p-type driving TFT portion "C" of FIG. 8I, are obtained. As illustrated in FIG. 5I, a first semiconductor layer 124 in the pixel TFT portion "A" includes the active region 124c of intrinsic silicon overlapping the first gate electrode 113, the LDD regions 124b of n– impurity-doped silicon at both sides of the active region 124c, and the ohmic contact regions 124a of n+ impurity-doped silicon at one side of the LDD regions 124b. Similarly, as illustrated in FIG. 8I, a second semiconductor layer 125 in the n-type driving TFT portion "B" includes the active region 125c of intrinsic silicon overlapping the gate electrode 114, the LDD regions 125b of n– impurity-doped silicon at one side of the active region 125c and the ohmic contact regions 125a of n+impurity-doped silicon at one side of the LDD regions 125b. A third semiconductor layer 126 in the p-type driving TFT portion "C" of FIG. 8I, includes the active region 126b of intrinsic silicon overlapping the gate electrode 115, and the ohmic contact regions 126a of p+ impurity-doped silicon at both sides of the active region 126b. In addition, a fourth semiconductor layer 127 in the storage capacitor area "StgA" of n+ impurity-doped silicon forms a second electrode of a storage capacitor because of its conductive property. A dummy intrinsic portion 123a and a dummy doped portion 128 of the polycrystalline silicon layer are removed in a subsequent process. In an embodiment, the polycrystalline silicon layer is doped with n-type impurities after doping with p-type impurities. However, the polycrystalline silicon layer may be doped with n-type impurities first, then doped with p-type impurities in another embodiment.

In FIGS. 5I, 6I, 7I and 8I, the polycrystalline silicon layer 123 (of FIGS. 5H, 6H, 7H and 8H) and the gate insulating layer 118 (of FIGS. 5H, 6H, 7H and 8H) are patterned through a fourth mask process to obtain the first, second, third and fourth semiconductor layers 124, 125, 126 and 127. Accordingly, the first semiconductor layer 124 including the ohmic contact regions 124a, the LDD regions 124b and the active region 124c in the pixel TFT portion "A," the second semiconductor layer 125 including the ohmic contact regions 125a, the LDD regions 125b and the active region 125c in the n-type driving TFT portion "B," the third semiconductor layer 126 including the ohmic contact regions 126a and the active region 125b in the p-type driving TFT portion "C" and the fourth semiconductor layer 127 in the storage capacitor area "StgA" are patterned to have an island shape. Because the polycrystalline silicon layer 123 (of FIGS. 5H, 6H, 7H and 8H) and the gate insulating layer 118 (of FIGS. 5H, 6H, 7H and 8H) are sequentially etched with an identical PR pattern, the patterned gate insulating layer 118 has the same shape as the first, second, third and fourth semiconductor layers 124, 125, 126 and 127. Accordingly, the pixel electrode 110 in the pixel electrode area "PA" and the gate line 112 in the gate line area "GLA" are exposed. In addition, the gate pad 116 in the gate pad area "GPA" is exposed.

In FIGS. 5J, 6J, 7J and 8J, a passivation layer 150 is formed on the first, second, third and fourth semiconductor layers 124, 125, 126 and 127. The passivation layer 150 may include one of inorganic insulating materials such as silicon nitride ($SiN_x$) and silicon oxide ($SiO_2$). In an embodiment, the passivation layer 150 includes a single layer, however, the passivation layer 150 may include a multiple layer of different insulating materials in another embodiment.

In FIGS. 5K, 6K, 7K and 8K, the passivation layer 150 is patterned through a fifth mask process to form a passivation pattern 150a. The passivation pattern 150a has an island shape and covers the active regions 124c, 125c and 126b, the LDD regions 124b and 125b, and some portions of the ohmic contact regions 124a, 125a and 126a in the pixel TFT portion "A," the n-type driving TFT portion "B" and the p-type driving TFT portion "C." The passivation pattern 150a also covers the fourth semiconductor layer 127 in the storage capacitor area "StgA" and the gate line 112 in the gate line area "GLA." Accordingly, edge portions of the ohmic contact regions 124a, 125a and 126a are exposed to contact source and drain electrodes without contact holes in a subsequent fabrication process. In addition, the pixel electrode 110 in the pixel electrode area "PA" and the gate pad 116 in the gate pad area "GPA" are also exposed.

Figure 5L:
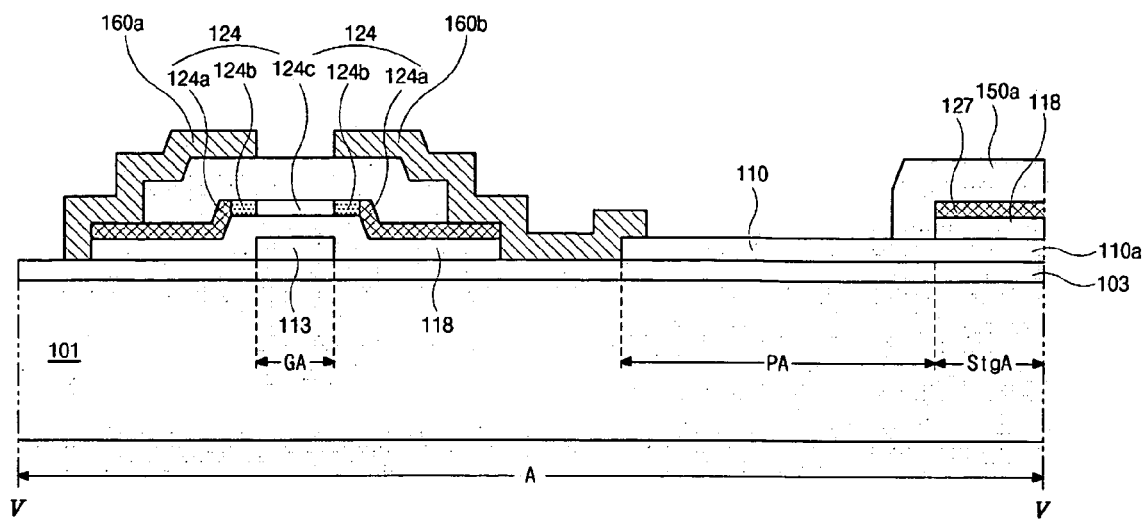
Figure 7L:
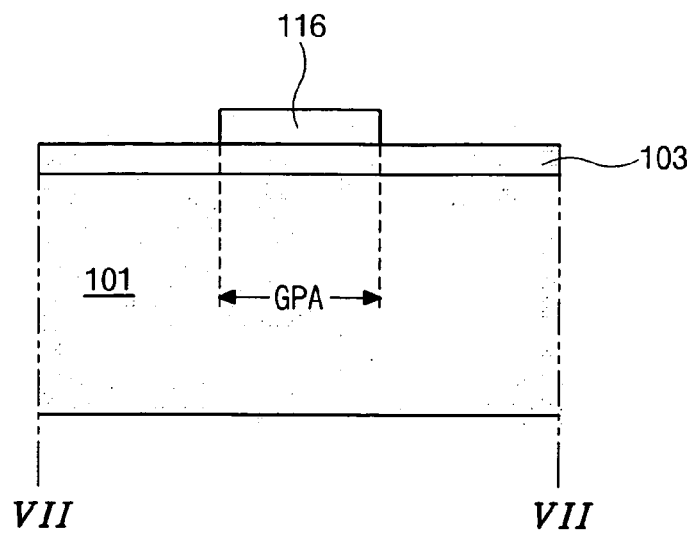
Figure 8L:
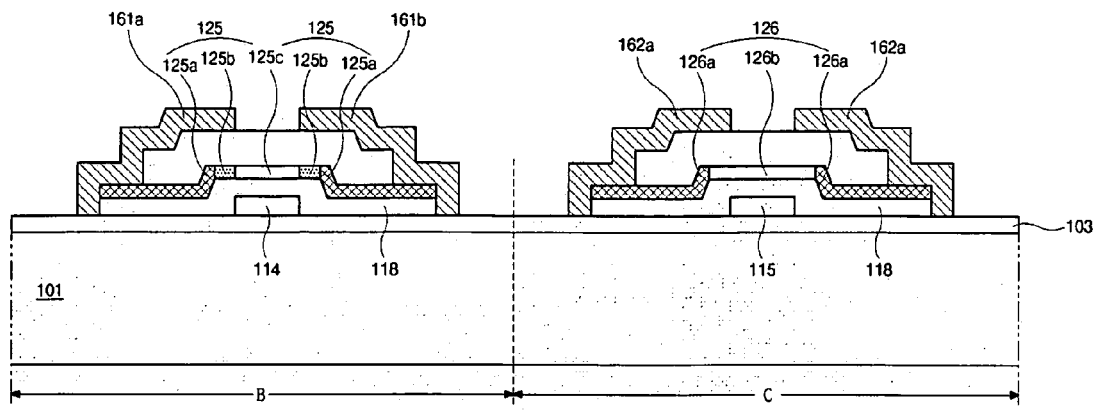

In FIGS. 5L, 6L, 7L and 8L, first source and drain electrodes 160a and 160b in the pixel TFT portion "A," second source and drain electrodes 161a and 161b in the n-type driving TFT portion "B," and third source and drain electrodes 162a and 162b in the p-type driving TFT portion "C" are formed on the passivation pattern 150a through a sixth mask process. At the same time, a data line (not illustrated) is formed on the buffer layer 103. The first source and drain electrodes 160a and 160b, the second source and drain electrodes 161a and 161b, the third source and drain electrodes 162a and 162b, and the data line may include one of molybdenum (Mo), chromium (Cr), aluminum (Al), copper (Cu), and alloy thereof. As illustrated in FIG. 5L, the first source and drain electrodes 160a and 160b are formed spaced apart from each other having the first gate electrode 113 defining the center portion and connected to the ohmic contact region 124a in the pixel TFT portion "A." Similarly, as illustrated in FIG. 8L, the second source and drain electrodes 161a and 161b are formed spaced apart from each other having the second gate electrode 114 defining the center portion and connected to the ohmic contact region 125a in the n-type driving TFT portion "B." In addition, the third source and drain electrodes 162a and 162b are formed spaced apart from each other having the third gate electrode 115 defining the center portion and connected to the ohmic contact region 126a in the p-type driving TFT portion "C."

Because the passivation pattern 150a covers the active regions 124c, 125c and 126b of the first, second and third semiconductor layers 124, 125 and 126, the active regions 124c, 125c and 126b forming a channel region are not deteriorated during etching process. The first to third source and drain electrodes 160a, 160b, 161a, 161b, 162a and 162b and the data line are formed during the etching process. In addition, the first source electrode 160a is connected to the data line and the first drain electrode 160b contacts a portion of the pixel electrode 110 in the pixel TFT portion "A." The other portion of the pixel electrode 110 in the pixel electrode area "PA" is exposed. Furthermore, the gate pad 116 in the gate pad area "GPA" of FIG. 7L is exposed.

In an embodiment, a pixel electrode in a pixel region is exposed and a drain electrode contacts the pixel electrode without a contact hole. However, a passivation having a contact hole may cover a pixel electrode and a drain electrode may contact a pixel electrode through a contact hole in another embodiment.

Figure 9A:
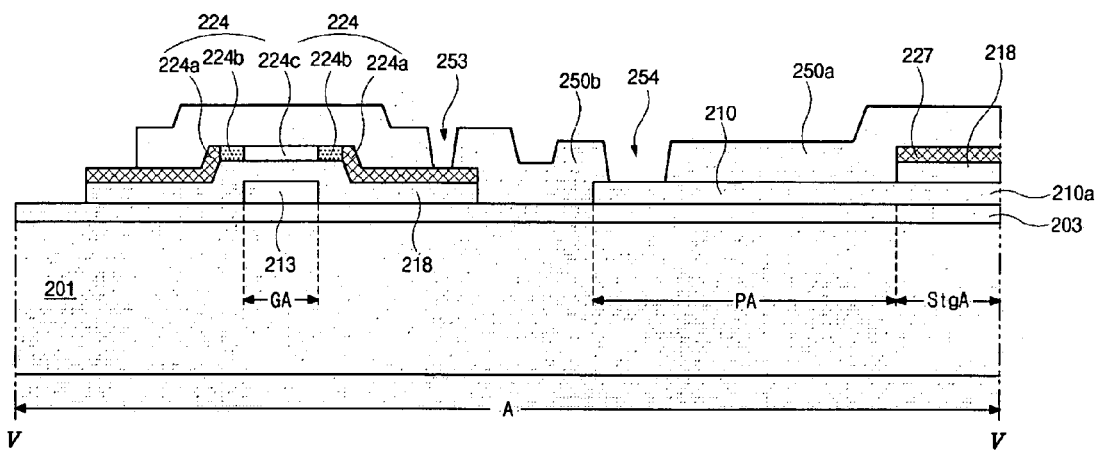
FIGS. 9A and 9B are schematic cross-sectional views taken along line "V-V" of FIG. 4 illustrating a fabricating process of an array substrate according to another exemplary embodiment of the present invention.
Figure 9B:
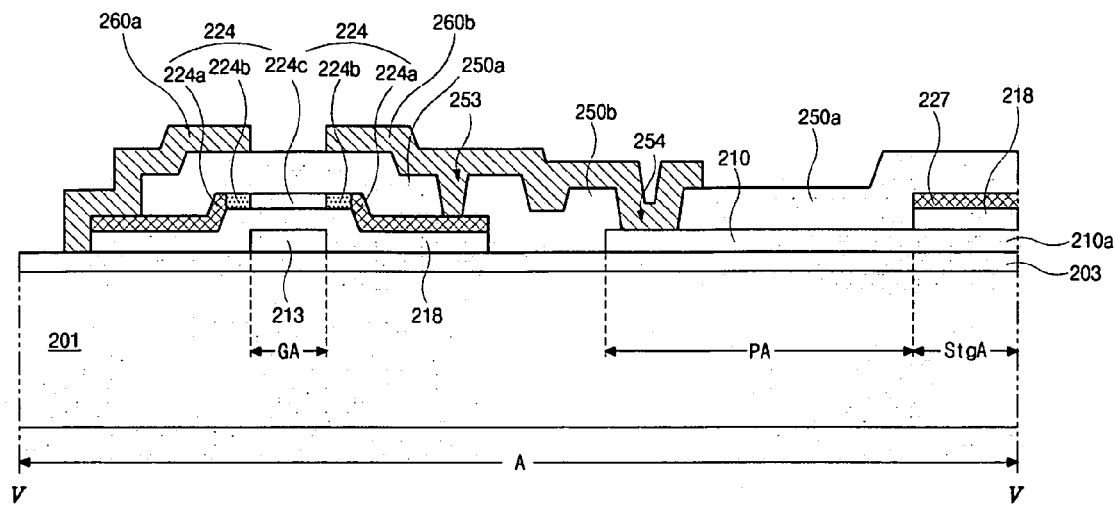

FIGS. 9A, 9B, 10A and 10B are schematic cross-sectional views showing a fabricating process of an array substrate according to another exemplary embodiment of the present invention. FIGS. 9A and 9B correspond to views taken along line "V-V" of FIG. 4, and FIGS. 10A and 10B correspond to views taken along line "VI-VI" of FIG. 4. Because fabrication steps from a buffer layer to a passivation layer are the same as those of the previous exemplary embodiment, fabrication steps after the passivation layer may be illustrated.

Figure 10A:
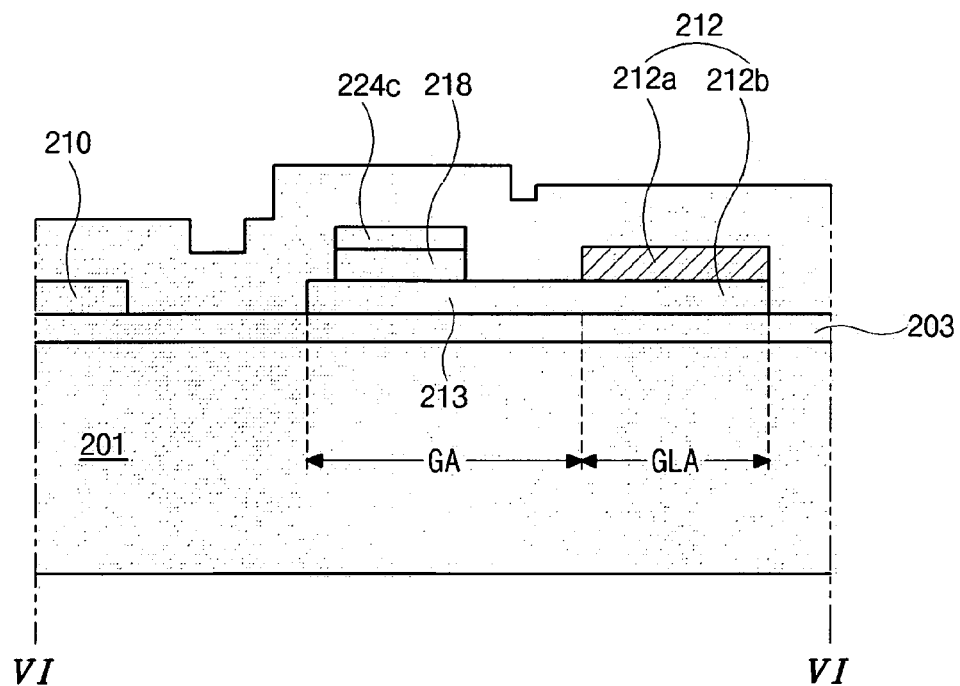
FIGS. 10A and 10B are schematic cross-sectional views taken along line "VI-VI" of FIG. 4 illustrating a fabricating process of an array substrate according to another exemplary embodiment of the present invention.

In FIGS. 9A and 10A, a passivation layer (not illustrated) is formed on semiconductor layers 224 and 227 in the pixel TFT portion "A." The passivation layer may include one of inorganic insulating materials such as silicon nitride ($SiN_x$) and silicon oxide ($SiO_2$). In an embodiment, the passivation layer 150 includes a single layer, however, the passivation layer 150 may include a multiple layer of different insulating materials in another embodiment. The passivation layer is patterned through a fifth mask process to form a passivation pattern 250a. The passivation pattern 250a has a semiconductor contact hole 253 exposing an ohmic contact region 224a and a pixel electrode contact hole 254 exposing a pixel electrode 210. Even though not illustrated in FIGS. 9A and 10A, the passivation pattern 250a covers active regions, an LDD regions and some portions of ohmic contact regions in an n-type driving TFT portion and a p-type driving TFT portion, thereby exposing edge portions of the ohmic contact regions. In addition, the passivation pattern 250a also exposes a gate pad.

Figure 10B:
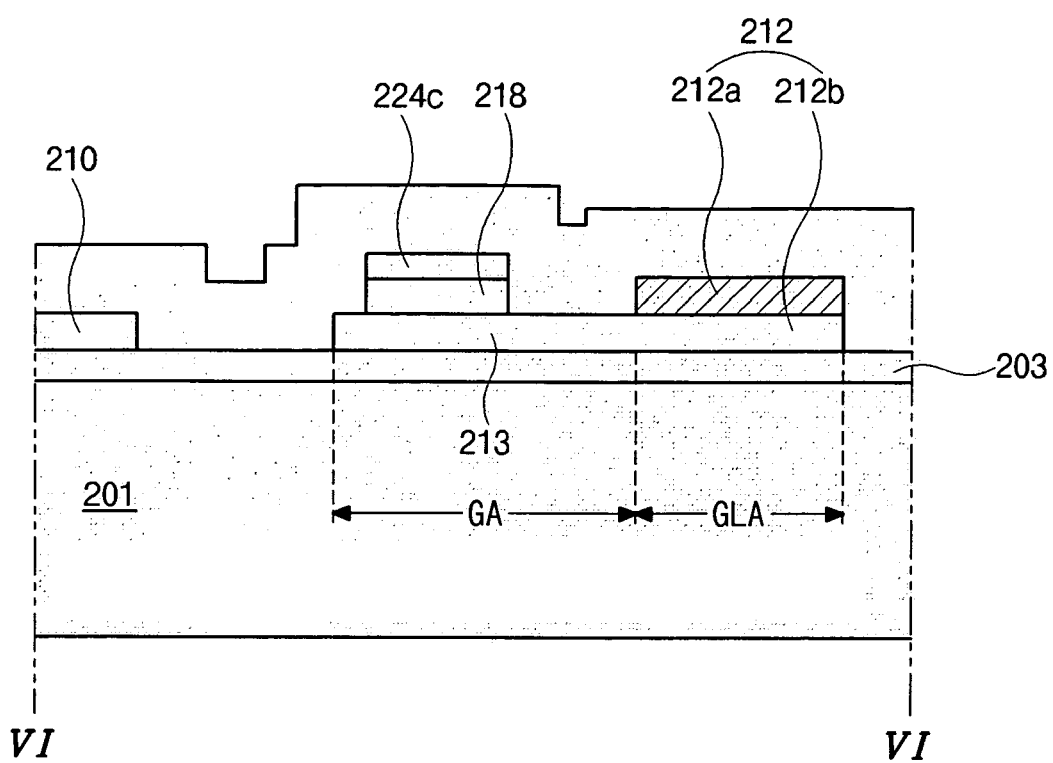

In FIGS. 9B and 10B, first source and drain electrodes 260a and 260b in the pixel TFT portion "A" are formed on the passivation pattern 250a through a sixth mask process. At the same time, a data line (not illustrated) connected to the first source electrode 260a is formed on the buffer layer 203. The first source and drain electrodes 260a and 260b and the data line may include one of molybdenum (Mo), chromium (Cr), aluminum (Al), copper (Cu), and alloy thereof. As illustrated in FIG. 9B, the first source and drain electrodes 260a and 260b are formed spaced apart from each other having a first gate electrode 213 defining the center portion and connected to the ohmic contact region 224a in the pixel TFT portion "A." Even though not illustrated in FIGS. 9B and 10B, second source and drain electrodes are formed spaced apart from each other having a second gate electrode defining the center portion and connected to the ohmic contact region in an n-type driving TFT portion, and third source and drain electrodes are formed spaced apart from each other having a third gate electrode defining the center portion and connected to the ohmic contact region in the p-type driving TFT portion.

Because the ohmic contact region 224a is exposed through the semiconductor contact hole 253 and the pixel electrode 210 is exposed through the pixel electrode contact hole 254, the first drain electrode 260b contacts the ohmic contact region 224a through the semiconductor contact hole 253 and contacts the pixel electrode 210 through the pixel electrode contact hole 254.

In an embodiment, an array substrate includes a driving circuit using a CMOS logic. However, a driving circuit may use a p-type metal-oxide-semiconductor (PMOS) logic in another embodiment. A pixel TFT and a driving TFT may be implemented by a p-type TFT without an n-type TFT in an array substrate using a PMOS logic. Accordingly, doping steps using high concentration n-type impurities (n+) and low concentration n-type impurities (n−) may be omitted, thereby fabricating an array substrate through a five-mask process. Similarly, a driving circuit may use an n-type metal-oxide-semiconductor (NMOS) logic in another embodiment. Further, n-type TFTs may be formed not to have an LDD structure. Accordingly, a pixel TFT and a driving TFT may be implemented by an n-type TFT without a p-type TFT in an array substrate using an NMOS logic and an array substrate can be formed through a five-mask process.

In the present invention, polycrystalline silicon TFTs of an LCD device includes a bottom gate structure. A gate line and a pixel electrode for a polycrystalline silicon TFT are formed through one-mask process using a mask having a half-transmissive area. In addition, after a passivation pattern of an island shape is formed, a data line, a source electrode and a drain electrode contacting the pixel electrode without a contact hole are formed on the passivation pattern. Accordingly, an array substrate for an LCD device including a driving circuit is fabricated through a six-mask process. As a result, production time and production cost are reduced, and a higher production yield is achieved. Moreover, because a passivation pattern of an island shape is formed on a polycrystalline silicon layer having an active region and an ohmic contact region, damages to a channel region of a polycrystalline silicon TFT during an etching process are prevented. Furthermore, when a driving circuit is formed to be driven by one of a PMOS logic and an NMOS logic, an array substrate for an LCD device including a driving circuit is fabricated through a five-mask process. Accordingly, production time, production cost and production yield are further improved. Additionally, because a gate electrode includes a thin single layer of a transparent conductive material, deterioration due to an increased step size of a gate electrode is prevented and crystallinity of a polycrystalline silicon layer is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate structure for a liquid crystal display device, comprising:

sequentially forming a transparent conductive material layer and a metallic material layer on a substrate defining a display area and a non-display area, the display area having a pixel TFT portion and a pixel electrode area, and the non-display area having an n-type driving TFT portion and a p-type driving TFT portion;

forming a first gate electrode in the p-type driving TFT portion, a second gate electrode in the n-type driving TFT portion, a third gate electrode in the pixel TFT portion, a gate line in the display area, a pixel electrode in the pixel electrode area, and a first capacitor electrode connected to the pixel electrode through a first mask process;

sequentially forming a gate insulating layer and a silicon layer on the first gate electrode, the second gate electrode, the third gate electrode, the gate line, the pixel electrode and the first capacitor electrode;

doping the silicon layer in the p-type driving TFT portion with high concentration p-type impurities (p+) through a second mask process to define a first active region and a first ohmic contact region;

doping the silicon layer in the pixel TFT portion and the n-type driving TFT portion with high concentration n-type impurities (n+) and low concentration n-type impurities (n−) through a third mask process to define second and third active regions, second and third ohmic contact regions, first and second lightly doped drain (LDD) regions and a storage capacitor area;

forming a first semiconductor layer in the p-type driving TFT portion, a second semiconductor layer in the n-type driving TFT portion, a third semiconductor layer in the pixel TFT portion, and a second capacitor electrode in the storage capacitor area through a fourth mask process;

forming a passivation pattern on the first, second and third semiconductor layers through a fifth mask process, wherein the passivation pattern covers the first, second and third active regions, and wherein the first, second and third ohmic contact regions are exposed through the passivation pattern; and forming first source and drain electrodes, second source and drain electrodes, third source and drain electrodes and a data line through a sixth mask process, the first source and drain electrodes contacting the first ohmic contact region, the second source and drain electrodes contacting the second ohmic contact region, the third source and drain electrodes contacting the third ohmic contact region, and the data line connected to the third source electrode.

2. The method according to claim 1, further comprising crystallizing the silicon layer.

3. The method according to claim 1, wherein the gate insulating layer includes an inorganic insulating material.

4. The method according to claim 1, wherein the passivation layer includes an inorganic insulating material.

5. The method according to claim 1, wherein the first semiconductor layer includes the first active region, the first ohmic contact region, wherein the second semiconductor layer includes the second active region, the second ohmic contact region and the first LDD region, wherein the third semiconductor layer includes the third active region and the third ohmic contact region and the second LDD region.

6. The method according to claim 1, wherein the first mask process comprises:

forming a photoresist (PR) layer on the metallic material layer;

disposing a gate-pixel mask having a transmissive area, a blocking area and a half-transmissive area over the PR layer, a light transmittance of the half-transmissive is lower than that of the transmissive area and higher than that of the blocking area;

exposing the PR layer through the gate-pixel mask;

developing the PR layer to form a first gate-pixel PR pattern having a first thickness and a second gate-pixel PR pattern having a second thickness greater than the first thickness, the first gate-pixel PR pattern overlapping the first, second, and third gate electrodes, the pixel electrode, and the first capacitor electrode, and the second gate-pixel PR pattern overlapping the gate line;

sequentially etching the metallic material layer and the transparent conductive material layer using the first and second gate-pixel PR patterns as an etching mask;

removing the first gate-pixel PR pattern to expose the metallic material layer;

etching the metallic material layer to expose the transparent conductive material layer; and removing the second gate-pixel PR pattern.

7. The method according to claim 6, wherein the PR layer has a positive type, the half-transmissive area corresponds to the first gate-pixel PR pattern and the blocking area corresponds to the second gate-pixel PR pattern.

8. The method according to claim 6, wherein removing the first gate-pixel PR pattern comprises removing a portion of the second gate-pixel PR pattern to reduce the second thickness.

9. The method according to claim 8, wherein removing the first gate-pixel PR pattern and partially removing the second gate-pixel PR pattern are performed anisotropically by at least one of ashing and stripping methods.

10. The method according to claim 1, wherein the gate line includes a double layer of the transparent conductive material layer and the metallic material layer.

11. The method according to claim 1, wherein the gate electrode includes a single layer of the transparent conductive material layer.

12. The method according to claim 1, further comprising disposing a buffer layer between the substrate and the transparent conductive material layer.

13. The method according to claim 12, wherein the buffer layer includes at least one of silicon nitride (SiNx) and silicon oxide ($SiO_2$).

14. The method according to claim 1, wherein the transparent conductive material layer includes at least one of indium-tin-oxide (ITO) and indium-zinc-oxide (IZO).

15. The method according to claim 1, wherein the transparent conductive material layer has a thickness within a range of about 500 Å to about 1000 Å.

16. The method according to claim 1, wherein the metallic material layer includes molybdenum (Mo).

17. The method according to claim 1, wherein the metallic material layer has a thickness less than about 3000 Å.

18. The method according to claim 1, wherein the second mask process comprises:

forming a p+ PR pattern on the silicon layer, the p+ PR pattern exposing a portion of the silicon layer corresponding to the first ohmic contact region;

doping the exposed silicon layer with the high concentration p-type impurities using the p+ PR pattern as a doping mask; and removing the p+ PR pattern.

19. The method according to claim 18, wherein the high concentration p-type impurities has a dose within a range of about $1\times10^{15}$ $cm^{-2}$ to about $9\times10^{16}$ $cm^{-2}$.

20. The method according to claim 1, wherein the third mask process comprises:
forming an n+ PR pattern on the silicon layer, the n+ PR pattern exposing first portions of the silicon layer corresponding to the second and third ohmic contact regions;
doping the exposed silicon layer with the high concentration n-type impurities using the n+ PR pattern as a doping mask;
removing portions of the n+ PR pattern to form an n– PR pattern exposing a second portions of the polycrystalline silicon layer corresponding to the first and second LDD regions;
doping the polycrystalline silicon layer in the first and second LDD regions with the low concentration n-type impurities using the n– PR pattern as a doping mask; and
removing the n– PR pattern.

21. The method according to claim 20, wherein the high concentration n-type impurities has a dose within a range of about $1 \times 10^{15}$ cm$^{-2}$ to about $9 \times 10^{16}$ cm$^{-2}$, and the low concentration n-type impurities has a dose within a range of about $1 \times 10^{13}$ cm$^{-2}$ to about $9 \times 10^{13}$ cm$^{-2}$.

22. The method according to claim 1, wherein the third drain electrode directly contacts the pixel electrode.

23. The method according to claim 1, wherein the passivation layer covers the gate line and the second capacitor electrode.

24. The method according to claim 1, wherein the passivation layer has a contact hole exposing the pixel electrode and the third drain electrode is connected to the pixel electrode through the contact hole.

25. A method of fabricating an array substrate structure for a liquid crystal display device, comprising:
sequentially disposing a transparent conductive material layer and a metallic material layer on a substrate defining a display area and a non-display area, the display area having a pixel TFT portion and a pixel electrode area, and the non-display area having a driving TFT portion;
forming a first gate electrode in the pixel TFT portion and a second gate electrode in the driving TFT portion, a gate line in the display area, a pixel electrode in the pixel electrode area through a first mask process, wherein a first capacitor electrode is connected to the pixel electrode;
sequentially disposing a gate insulating layer and a silicon layer on the first, second gate electrodes, the gate line, the pixel electrode, and the first capacitor electrode;
doping the silicon layer with impurities through a second mask process to define a first active region, a first ohmic contact region, and storage capacitor area in the pixel TFT portion, and a second active region and a second ohmic contact region in the driving TFT portion;
forming a first semiconductor layer in the pixel TFT portion, a second semiconductor layer in the driving TFT portion, and a second capacitor electrode in the storage capacitor area through a third mask process;
forming a passivation pattern on the first and second silicon layer through a fourth mask process, wherein the passivation pattern covers the first and second active regions, and wherein the first and second ohmic contact regions are exposed through the passivation pattern;
forming first source and drain electrodes, second source and drain electrodes, and a data line through a fifth mask process, the first source and drain electrodes contacting the first ohmic contact region, the second source and drain electrodes contacting the second ohmic contact region, and the data line connected to the first source electrode.

26. The method according to claim 25, wherein the impurities include at least one of n-type and p-type impurities.

27. The method according to claim 25, further comprising crystallizing the silicon layer.

28. The method according to claim 25, wherein the first mask process comprises:
disposing a PR layer on the metallic material layer;
disposing a gate-pixel mask having a transmissive area, a blocking area and a half-transmissive area over the PR layer, a light transmittance of the half-transmissive area is lower than that of the transmissive area and higher than that of the blocking area;
exposing the PR layer using the gate-pixel mask;
developing the PR layer to form a first gate-pixel PR pattern having a first thickness and a second gate-pixel PR pattern having a second thickness greater than the first thickness, the first gate-pixel PR pattern overlapping the first and second gate electrodes, the pixel electrode, and the first capacitor electrode, the second gate-pixel PR pattern overlapping the gate line;
sequentially etching the metallic material layer and the transparent conductive material layer using the first and second gate-pixel PR patterns as an etching mask;
removing the first gate-pixel PR pattern to expose the metallic material layer; etching the metallic material layer to expose the transparent conductive material layer; and
removing the second gate-pixel PR pattern.

29. The method according to claim 25, wherein the second mask process comprises:
forming a doping PR pattern on the polycrystalline silicon layer, the doping PR pattern exposing a portion of the polycrystalline silicon layer corresponding to the first and second ohmic contact regions;
doping the polycrystalline silicon layer with the impurities using the doping PR pattern as a doping mask; and
removing the doping pattern.

* * * * *